(12) United States Patent
LaFrance

(10) Patent No.: US 6,227,601 B1
(45) Date of Patent: May 8, 2001

(54) MOTOR DRIVEN SUNSHIELD

(76) Inventor: Joseph E. LaFrance, 1450 Beach Blvd., Apt. 514, Biloxi, MS (US) 39530-3506

( * ) Notice: Subject to any disclaimer, the term of this patent is extended or adjusted under 35 U.S.C. 154(b) by 0 days.

(21) Appl. No.: 09/528,839

(22) Filed: Mar. 20, 2000

(51) Int. Cl.[7] .................................................. B60J 3/02
(52) U.S. Cl. ..................... 296/97.4; 296/97.8; 296/97.11
(58) Field of Search ................................. 296/97.4, 97.8, 296/97.9, 97.11

(56) References Cited

U.S. PATENT DOCUMENTS

| | | |
|---|---|---|
| 4,867,220 | 9/1989 | Matsumoto . |
| 4,886,104 | 12/1989 | Eldridge . |
| 4,929,014 * | 5/1990 | Clark et al. ........................ 296/97.8 |
| 5,038,844 | 8/1991 | Edmonds et al. . |
| 5,560,668 * | 10/1996 | Li ....................................... 296/97.8 |
| 5,746,469 * | 5/1998 | Nonaka ............................. 296/97.7 |
| 5,947,544 * | 9/1999 | Hubeshi ............................ 296/97.4 |
| 6,086,133 * | 7/2000 | Alonso .............................. 296/97.8 |
| 6,095,231 * | 8/2000 | Hahn ............................... 160/370.22 |

* cited by examiner

Primary Examiner—D. Glenn Dayoan
Assistant Examiner—Patricia Engle
(74) Attorney, Agent, or Firm—George E. Stanford, Jr.

(57) ABSTRACT

A motor driven sunshield for permanent installation within the interior of an automotive vehicle, securely attached to the roof of the vehicle between the roof interior surface and the interior roof lining. Operable in either manual or semi-automatic mode, the sunshield can be deployed while the vehicle transmission is in PARK mode to cover the windshield of the vehicle for preventing potentially damaging solar radiation from entering the interior of the vehicle through the windshield. Conversely when the transmission is in RUN mode, i.e. drive, reverse, or neutral, the sunshield is automatically retracted to provide unobstructed views for the driver. When fabricated from a suitably tough material and the electrical control circuitry configured to permit a secure locked condition, the deployed sunshield can also offer a deterrent to unauthorized operation of the vehicle.

19 Claims, 16 Drawing Sheets

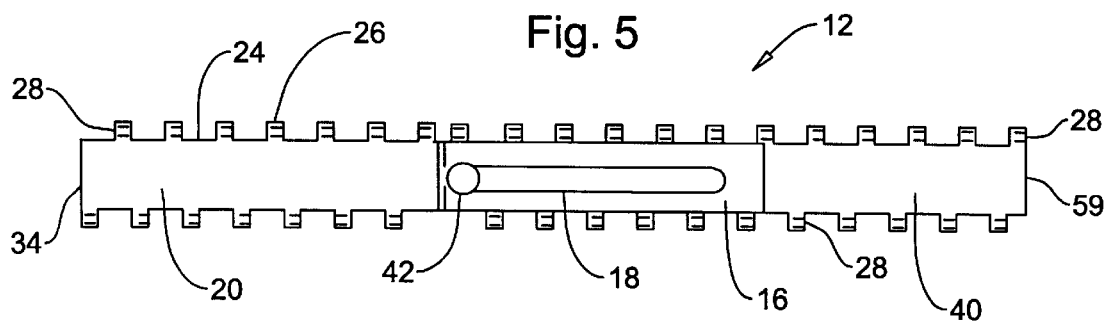
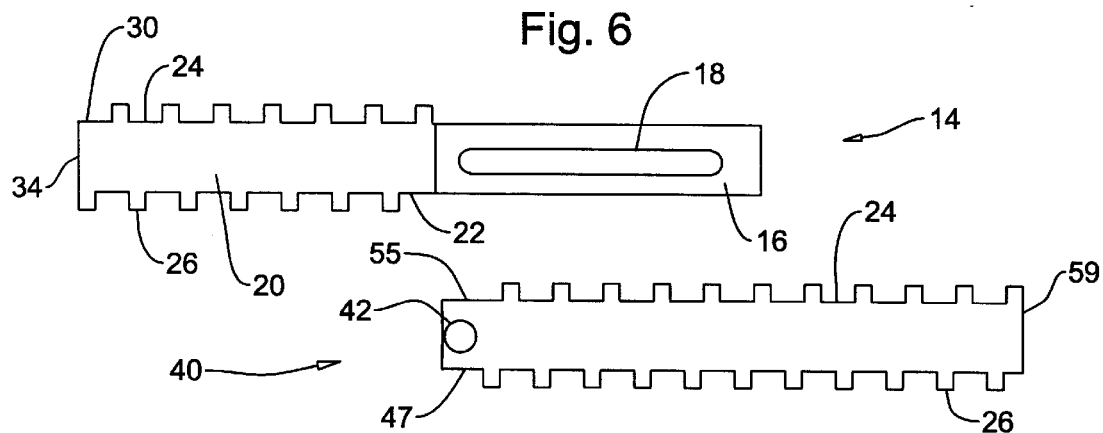
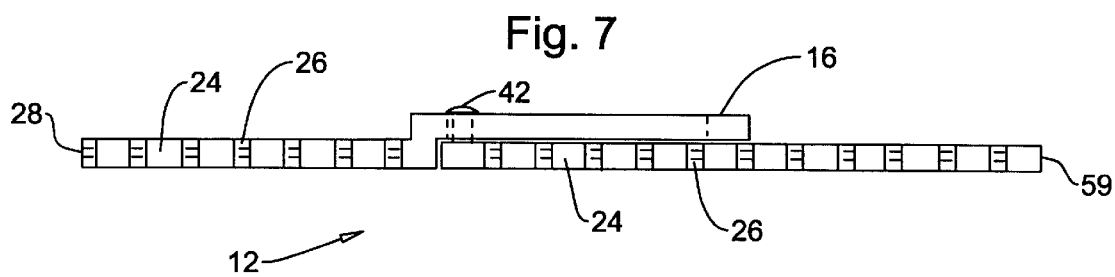
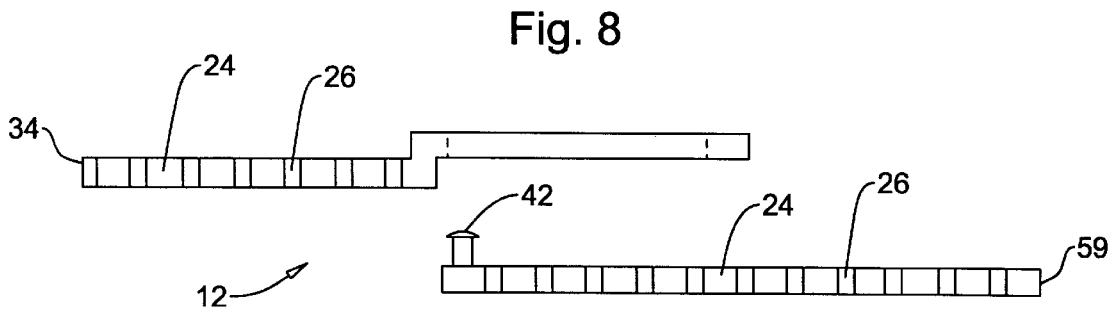

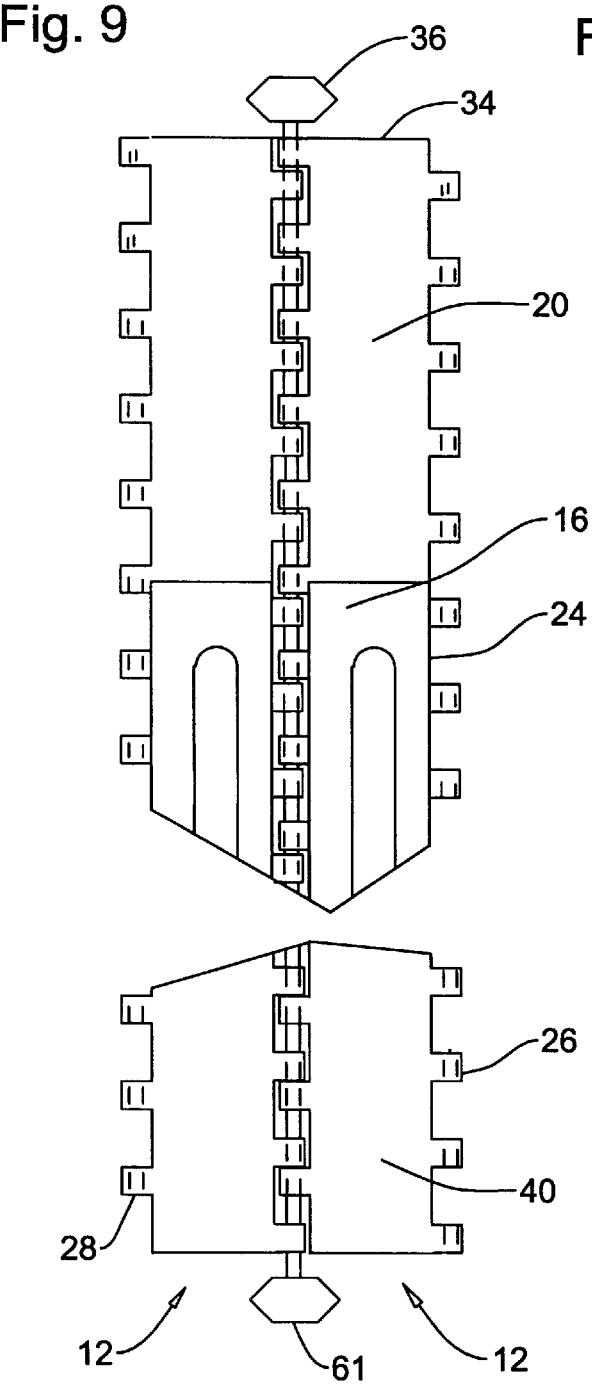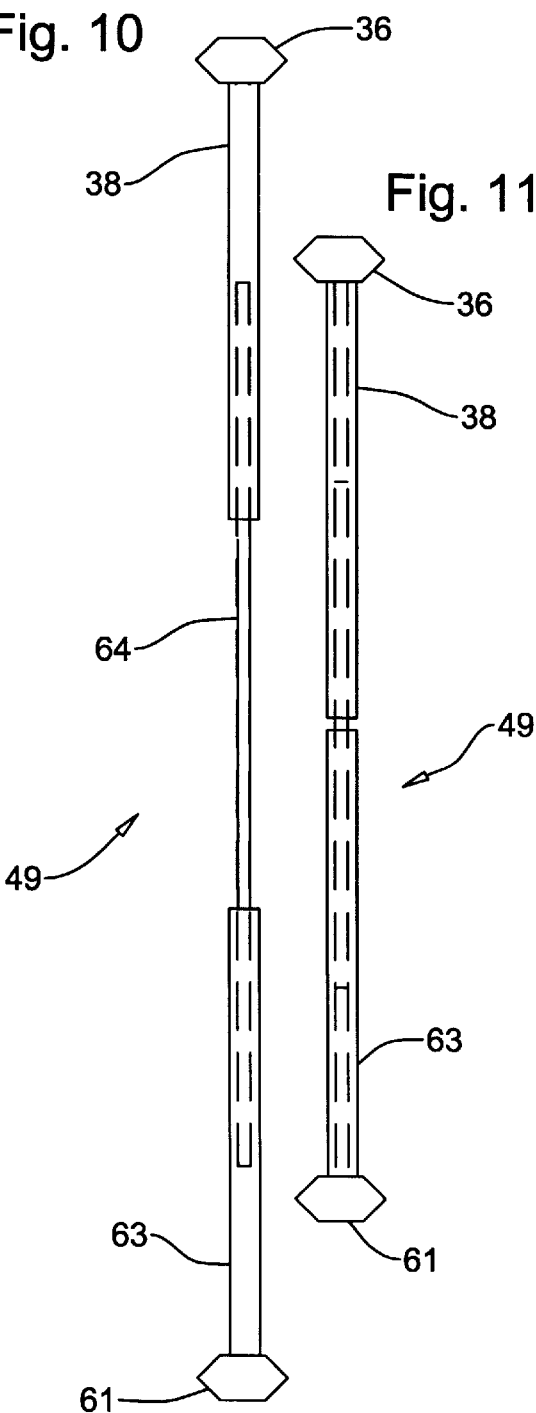

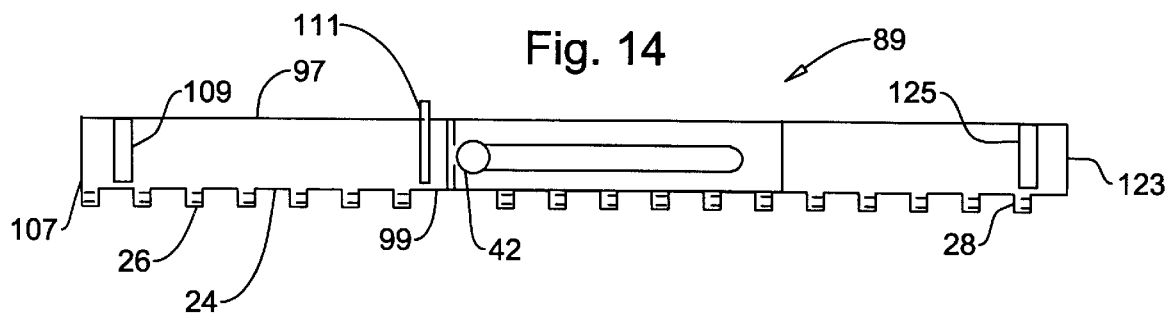
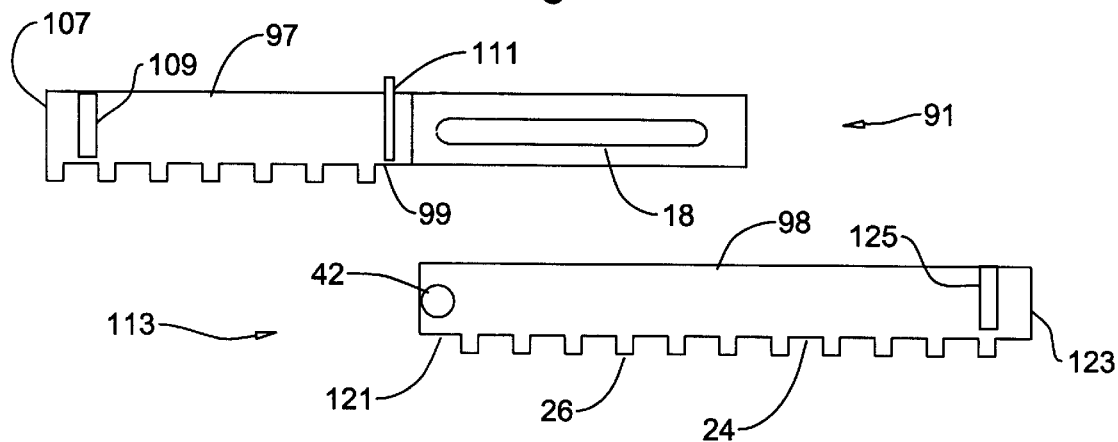
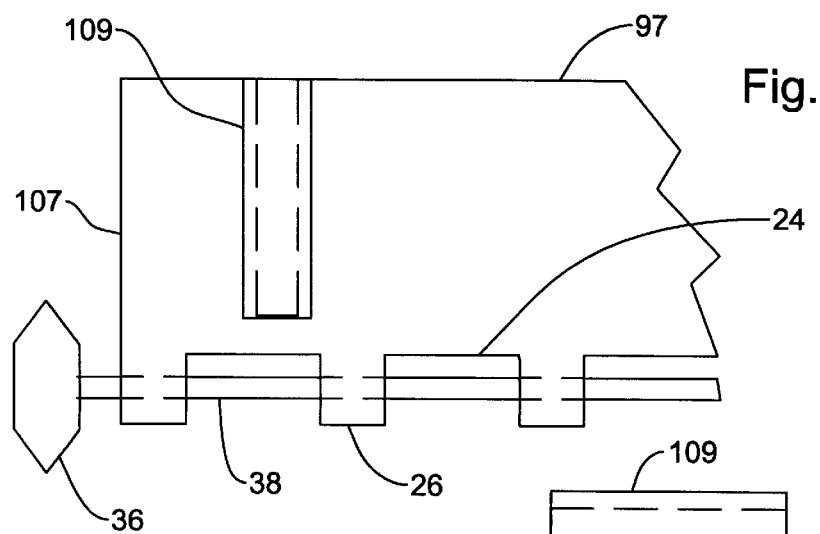
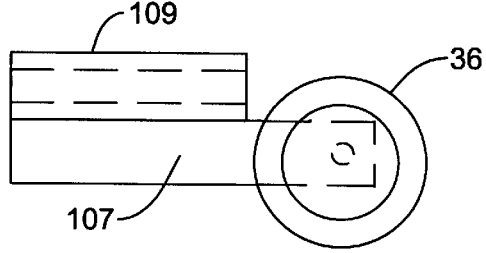

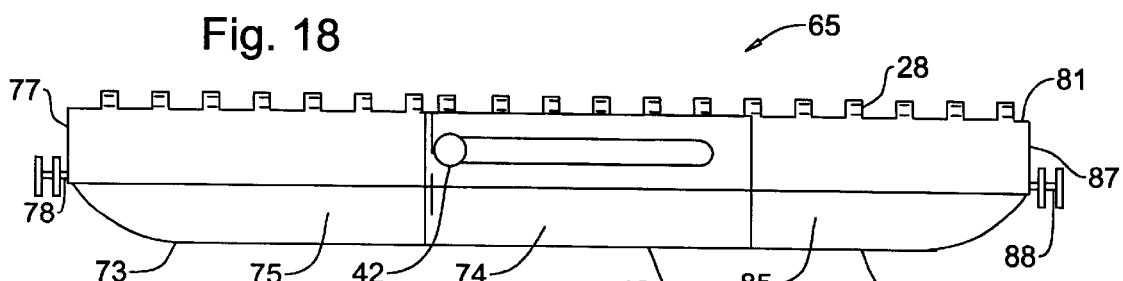
Fig. 18
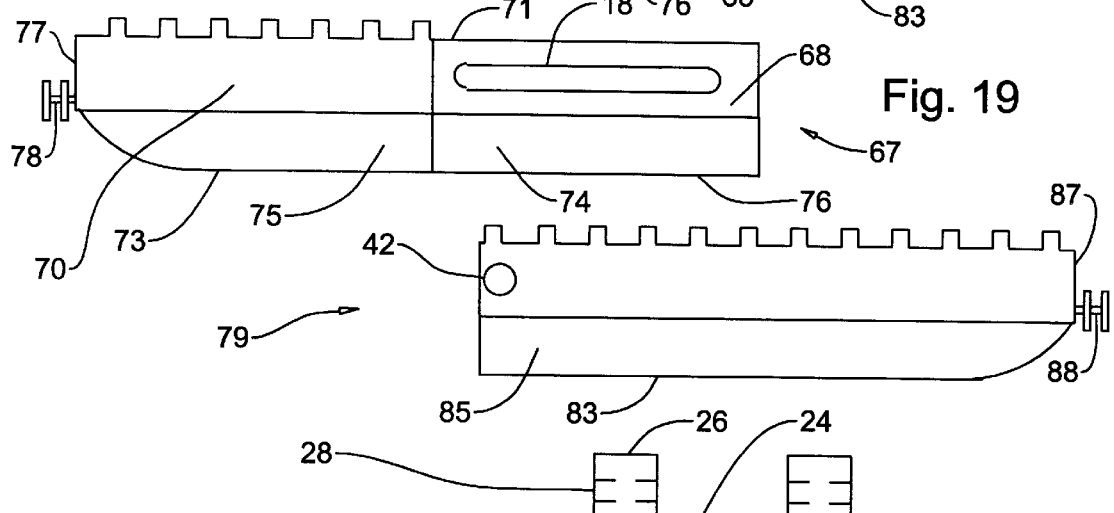
Fig. 19
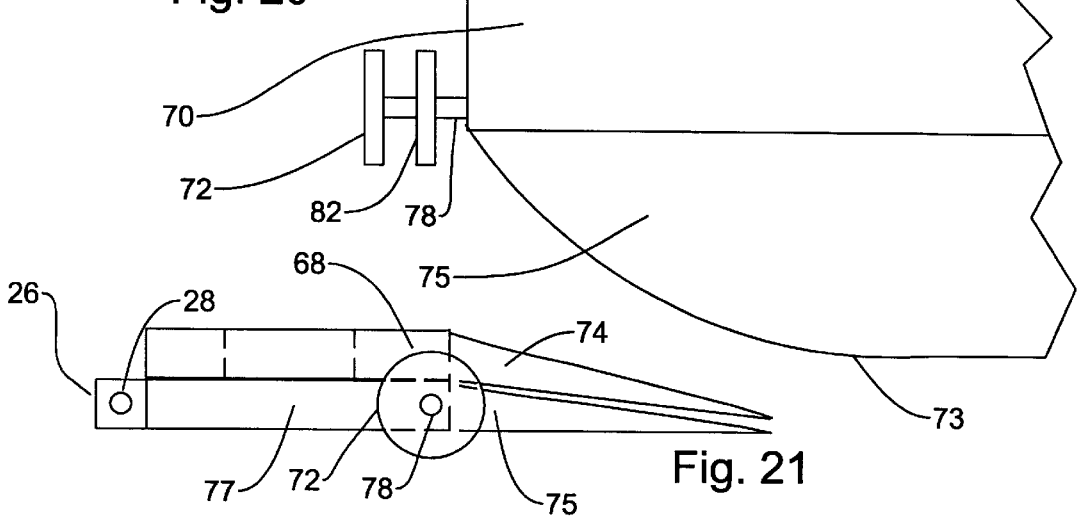
Fig. 20
Fig. 21

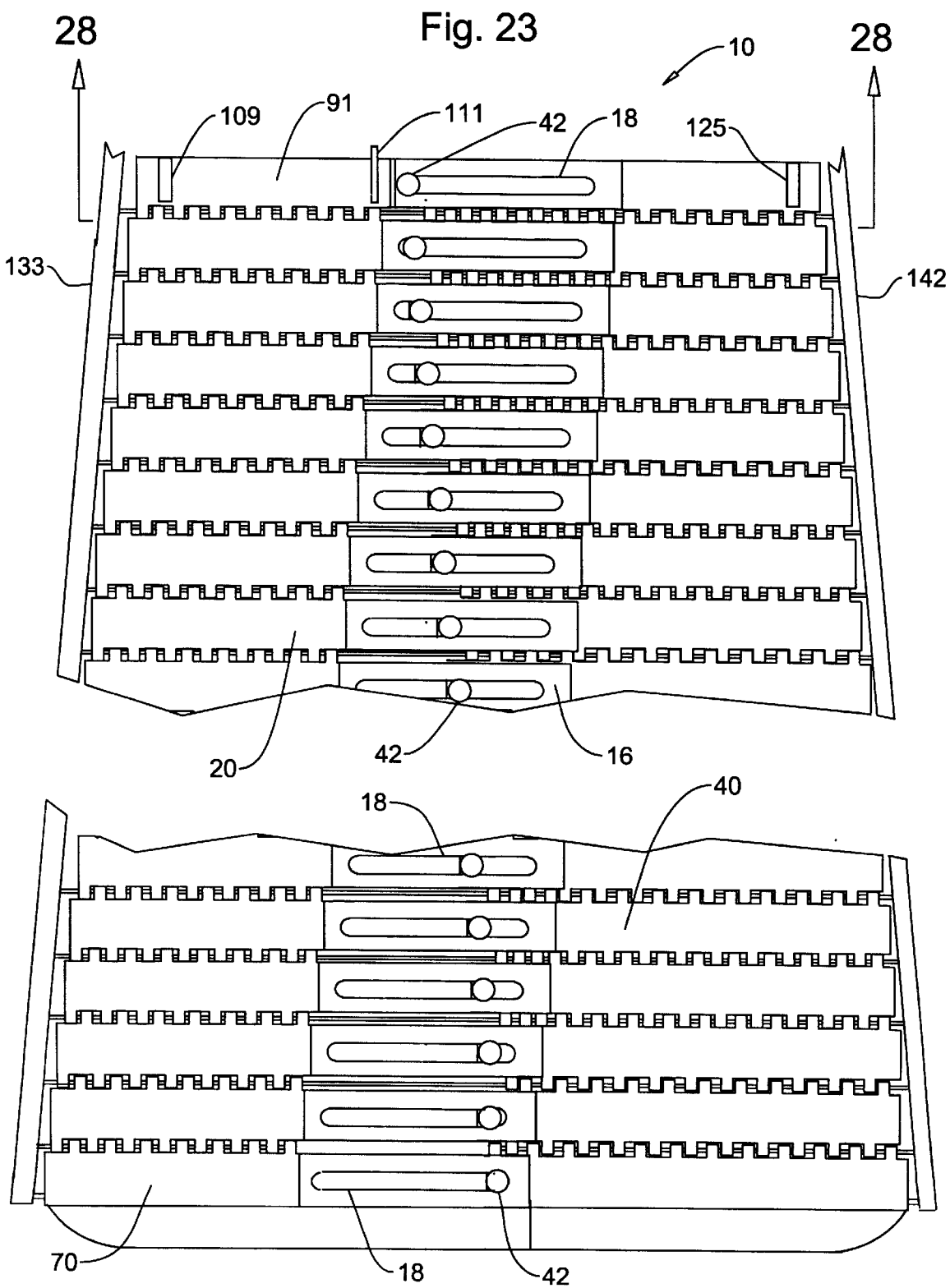

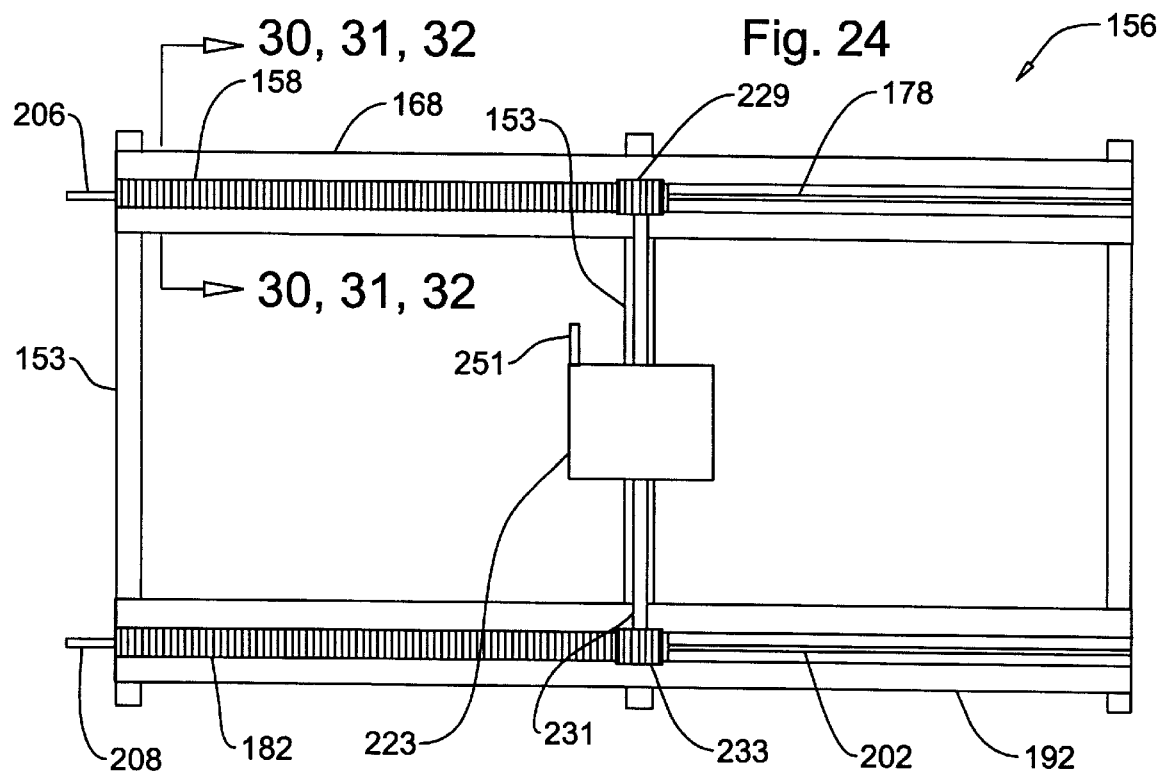
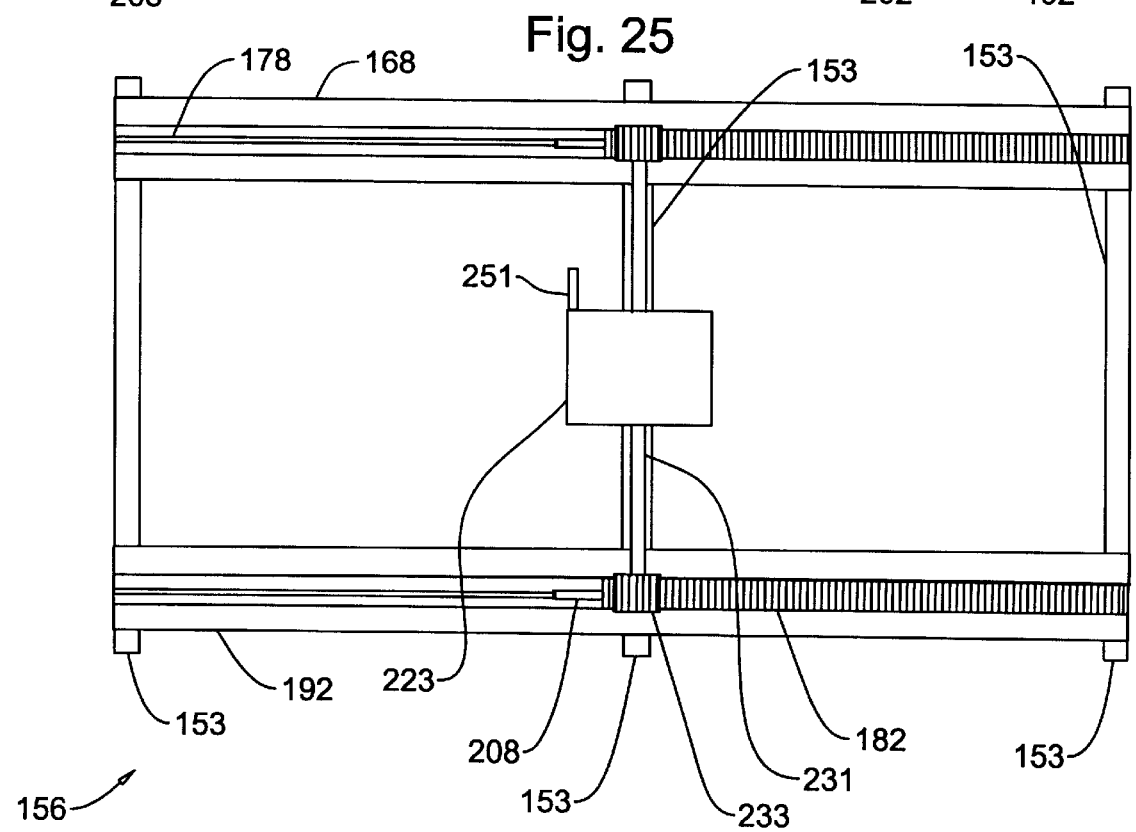

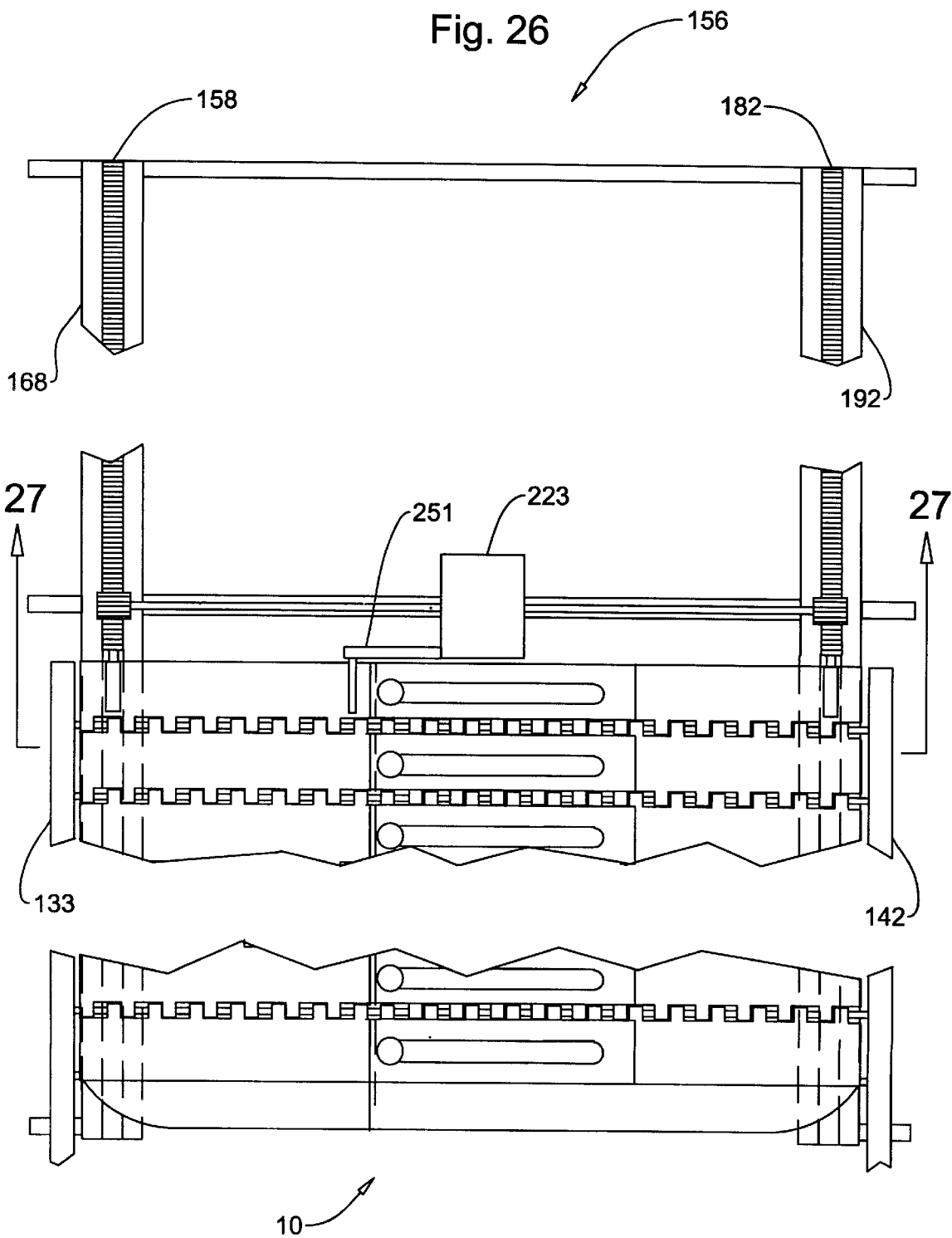

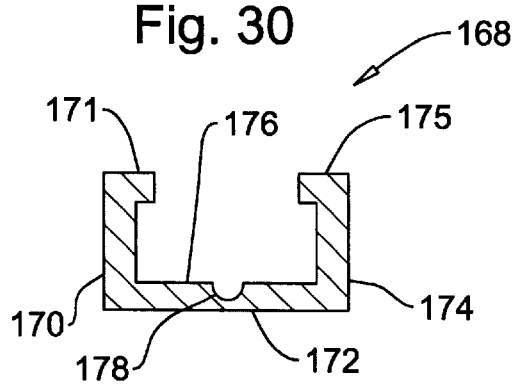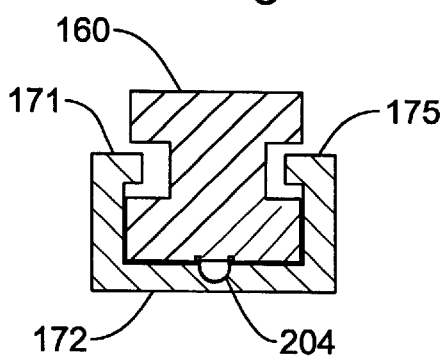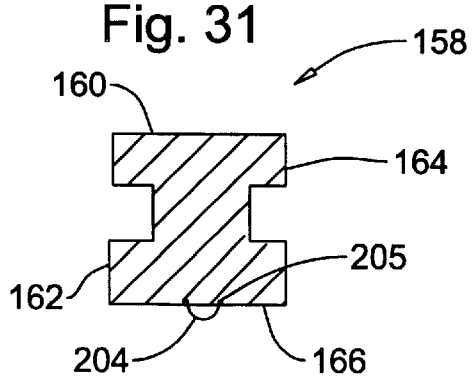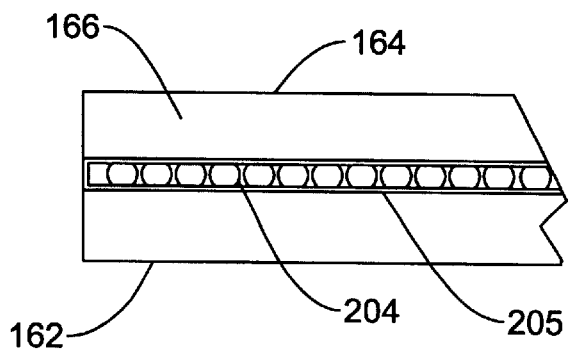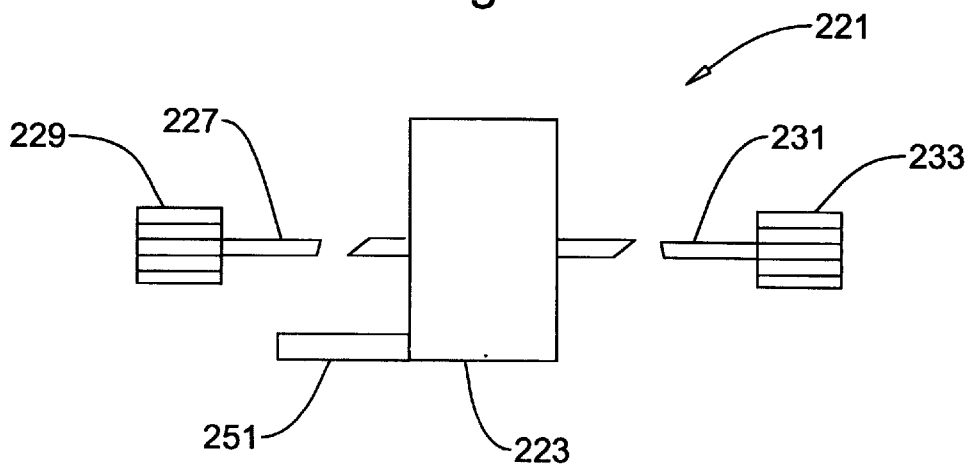

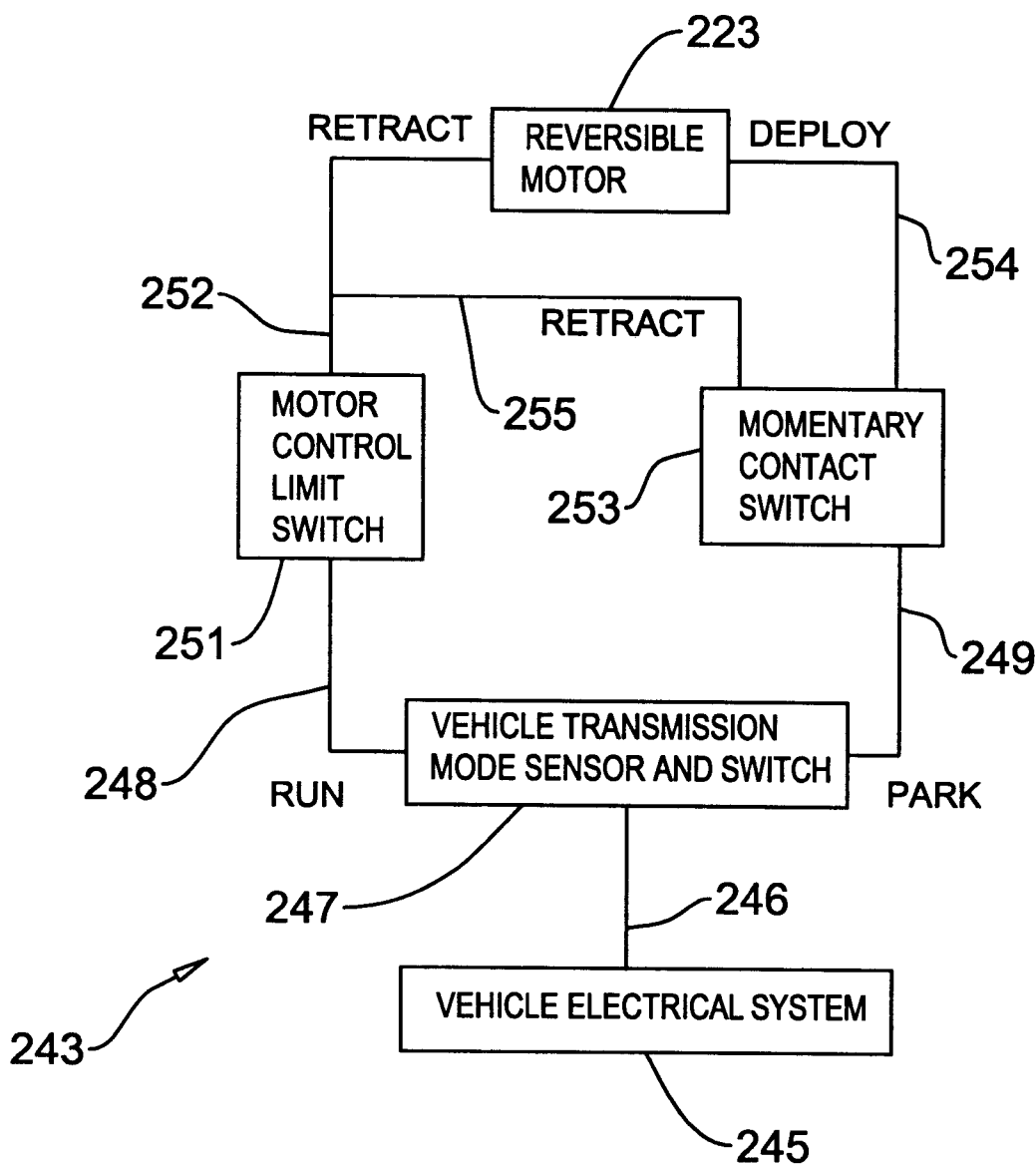

MOTOR DRIVEN SUNSHIELD

BACKGROUND

1. Field of the Invention

The present invention concerns generally a sunshield for installation in a vehicle. In particular, the present invention is directed to a manually and automatically controlled motor driven sunshield for automotive vehicles, wherein the present invention is installed in a motor vehicle featuring a windshield and a roof covering the driver and passenger seating area, and wherein such vehicle features an electrical system, an ignition key control system, an automatic transmission system, and a roof system covering the driver and passenger seating area, all such systems in communication therewith. For example, the present invention, powered by the vehicle's electrical system and attached to the interior of the roof, provides a motor driven shield that automatically deploys to cover the interior surface of the vehicle windshield when the transmission lever is in PARK position and the ignition key is turned off. Conversely, when the ignition key is turned on and the transmission lever is placed in NEUTRAL, DRIVE or REVERSE position, the motor driven shield automatically retracts to allow safe, unrestricted visibility through the windshield. Although the present invention is automatically controlled by communication with the ignition key system and the automatic transmission system, the shield additionally may be retracted or deployed when the transmission is in PARK position, through manual operation of a momentary contact switch. When extended to cover the windshield and the ignition key removed, the present invention, in conjunction with a security system, obscures driver visibility through the windshield, providing some deterrence to unauthorized operation of the automobile.

2. Description of Related Art

Manually placed and adjusted sunshields for temporarily covering the windshield of an automotive vehicle are nearly ubiquitous, available in a plethora of shapes, sizes, and colors, providing ample testimony for the need to protect the dashboard of contemporary motor vehicles. Unfortunately, forgetfulness on the part of the motor vehicle operator often results in an overheated vehicle or, worse, a damaged dashboard, when the simple, manually placed sunshield is absent from its intended position. U.S. Pat. No. 5,038,844 "AUTO WINDOW SHADE" and U.S. Pat. No. 4,886,104 "WINDOW SHADE APPARATUS" are incorporated herein by reference for the purpose of indicating the mature state of the art for providing a temporary sunshade for covering the windshield and protecting the dashboard and interior of a motor vehicle.

In addition to providing protection from the sun's rays traveling through the windshield, other inventions disclose sunshields for the side windows and sunroof of motor vehicles. U.S. Pat. No. 4,867,220 "SUNSHADE ASSEMBLEY OF MOTOR VEHICLE" is incorporated herein by reference for the purpose of indicating the mature state of the art for providing a sunshade for use with a sun roof construction of a motor vehicle.

SUMMARY

An object of the present invention is to provide a permanently installed, motor driven sunshield to prevent potentially damaging solar radiation from passing through the windshield and entering the interior of an automotive vehicle. A further object of the present invention is to provide both manual and automatic operation of the motor driven sunshield. For example, the sunshield automatically fully deploys when transmission is placed in PARK and the ignition key turned off; subsequently, the sunshield can be partially or fully retracted with a manually operated momentary contact switch while in the PARK mode; and the sunshield automatically fully retracts when the ignition key is turned on and the transmission placed in NEUTRAL, DRIVE or REVERSE. Another object of the present invention is to provide a securable sunshield mechanism that deters unauthorized operation of the sunshield.

The present invention relieves the motorist, particularly those motorists driving in sunny regions, from having to place and subsequently remove from the interior of the windshield a simple fabric or paper product sun shield. The popularity of these inexpensive sun shields is demonstrated by their ubiquity in the South and Southwest regions. However, these inexpensive devices do deteriorate and wear out. The present invention is intended for permanent installation.

Manual placement and removal of the inexpensive sunshields is time consuming and sometimes inconvenient; consequently, motorists, confronted with the dilemma of whether to place the inexpensive sunshield, often opt not to place the device, particularly on a cloudy or overcast day. Unfortunately, the motorist may often return to the vehicle, chagrined to find the bright rays of a sunny day entering the unprotected windshield, heating the interior of the vehicle and potentially damaging the dashboard. The present invention automatically deploys when the ignition key is turned off, removing this vexation to the motorist.

The slats of the present invention may be fabricated from a strong material, such as metal or polycarbonates. Use of a tough, resilient slat material, in conjunction with a security locking system for the deployment and retraction control mechanism, can deter unauthorized operation of the present invention.

BRIEF DESCRIPTION OF THE DRAWINGS

FIG. 5 is a top view of an embodiment of an intermediate slat assembly according to the present invention, the slat assembly comprising a slot section and a pin section, wherein the slot section comprises a slotted slat upper section and a slotted slat lower section, formed as a unit. The slotted slat lower section and pin section each feature a first crenelated edge and a second crenelated edge. The merlons, defining the crenels, each feature a merlon bore, parallel to the lengthwise axis of the slat assembly. The merlons and crenels are not of equal width.

FIG. 6 is an exploded top view of FIG. 5. For clarity, the merlon bores are not shown.

FIG. 7 is a side view of an embodiment of an intermediate slat assembly according to the present invention, previously shown in FIG. 5 in a top view.

FIG. 8 is an exploded side view of FIG. 7. For clarity, the merlon bores are not shown. The slot retaining pin, in conjunction with the slot formed in the slotted slat upper section, assists maintaining the pin section and the slotted slat upper section in a proximate relationship.

FIG. 9 is a top view of an embodiment of an intermediate slat assembly according to the present invention, wherein two of such slat assemblies are joined together with a compressible dual axle and wheel assembly, illustrating how a plurality of slat assemblies are combined to form a shield. The compressible dual axle turns freely in the associated merlon bore.

FIG. 10 is an exemplary view of the compressible dual axle and wheel assembly according to the present invention, illustrating the assembly in the extended mode of use. Also shown is the connective axle pin.

FIG. 11 is an exemplary view of the compressible dual axle and wheel assembly according to the present invention, illustrating the assembly in the compressed mode of use. Here the connective axle pin is fully enclosed within the dual axles.

FIG. 14 is a top view of an exemplary embodiment of a driver slat assembly according to the present invention, the slat assembly comprising a slot section and a pin section, wherein the slot section comprises a slotted slat upper section and a slotted slat lower section, formed as a unit. The slotted slat lower section and pin section each feature a driver slat crenelated edge. The merlons, defining the crenels, each feature a merlon bore, parallel to the lengthwise axis of the slat assembly. The merlons and crenels are not of equal width. The driver slat assembly includes a first rack connective mount and second rack connective mount used for connecting the driver slat to a mechanical means for deploying and retracting the driver slat and all other slats connected thereto.

FIG. 15 is an exploded view of FIG. 14. In the interest of clarity, the merlon bores are not shown.

FIG. 16 is an enlarged broken view of the first wheel edge (leftmost portion) of FIG. 14, additionally including a first wheel and associated axle to illustrate how the axle passes through and turns freely within each participating merlon bore of a slat. Also shown is a first rack connective mount used for connecting the driver slat to a mechanical means for deploying and retracting the driver slat and all other slats connected thereto.

FIG. 17 is an end view of FIG. 16.

FIG. 18 is a top view of an exemplary embodiment of a skirt slat assembly according to the present invention, the slat assembly comprising a slot section and a pin section, wherein the slot section comprises a slotted slat upper section and a slotted slat lower section, formed as a unit. The slotted slat lower section and pin section each feature a skirt slat crenelated edge. The merlons, defining the crenels, each feature a merlon bore, parallel to the lengthwise axis of the slat assembly. The merlons and crenels are not of equal width. The skirt slat assembly includes a pliable skirt, which is molded to conform to the general contour of the vehicle dashboard.

FIG. 19 is an exploded view of FIG. 18. For clarity, the merlon bores are not shown.

FIG. 20 is an enlarged broken view of the first skirt section guide pin edge (leftmost portion) of FIG. 18, further illustrating the first dual disk flange guide pin and a portion of the skirt.

FIG. 21 is an end view of FIG. 20.

FIG. 23 is an exemplary top view of an embodiment of a motor driven sunshield according to the present invention, illustrating, in deployed position, a sun shield assembly comprising a driver slat assembly, a skirt slat assembly, and a plurality of intermediate slat assemblies interconnected, by a plurality of dual axles, between and to the driver slat assembly and skirt slat assembly. Also illustrated are the first and second wheel tracks associated with first and second wheels, with their dual axles, and the guide pins. The retaining pin of each slat assembly lies in a line not perpendicular to the principal axis of the slats, confirming the slats and dual axles are in the extended (deployed) mode. For clarity, the first and second wheels are not shown.

FIG. 24 is an exemplary top view of an embodiment of a motor driven sunshield according to the present invention, illustrating, in deployed mode, a rack assembly and drive assembly, including a first and second pinion. A first rack drive rod extends from a first rack and a second rack drive rod extends from a second rack, the drive rods normally connected to an associated connection mount on a driver slat assembly.

FIG. 25 is an exemplary top view of an embodiment of a motor driven sunshield according to the present invention, illustrating, in retracted mode, a rack assembly and drive assembly, including a first and second pinion. A first rack drive rod extends from a first rack and a second rack drive rod extends from a second rack, the drive rods normally connected to an associated connection mount on a driver slat assembly.

FIG. 26 is an exemplary top view of an embodiment of a motor driven sunshield according to the present invention, illustrating, in retracted mode, a shield assembly connected to a rack assembly and drive assembly, including a first and second pinion. Here a first rack drive rod extends from a first rack and a second rack drive rod extends from a second rack, the drive rods connected to an associated connection mount on a driver slat assembly.

FIG. 30 is a partial sectional view of FIG: 24, illustrating exclusively a cross-section of a rack guide, including a rack guide raceway.

FIG. 31 is a partial sectional view of FIG. 24, illustrating exclusively a cross-section of a rack, including a rack bearing ball.

FIG. 32 is a partial sectional view of FIG. 24, illustrating exclusively a cross-section of a rack guide and rack.

FIG. 33 is a broken view of the underside of a rack, illustrating a plurality of rack bearing balls and rack bearing ball retainer.

FIG. 34 is a broken view of the drive assembly, illustrating the reversible drive motor, motor limit switch, first and second pinions, and first and second motor shafts.

FIG. 38 is an exemplary electrical circuit schematic connecting the motor driven sun shield to the electrical system of the vehicle, according to the present invention. The electrical circuit, including sensors and switches, allows deployment of the sunshield only when the vehicle transmission is in PARK mode. In DRIVE mode, the sunshield is automatically retracted to provide unobstructed vision for the driver.

DESCRIPTION OF THE PREFERRED EMBODIMENT

Figure 1:
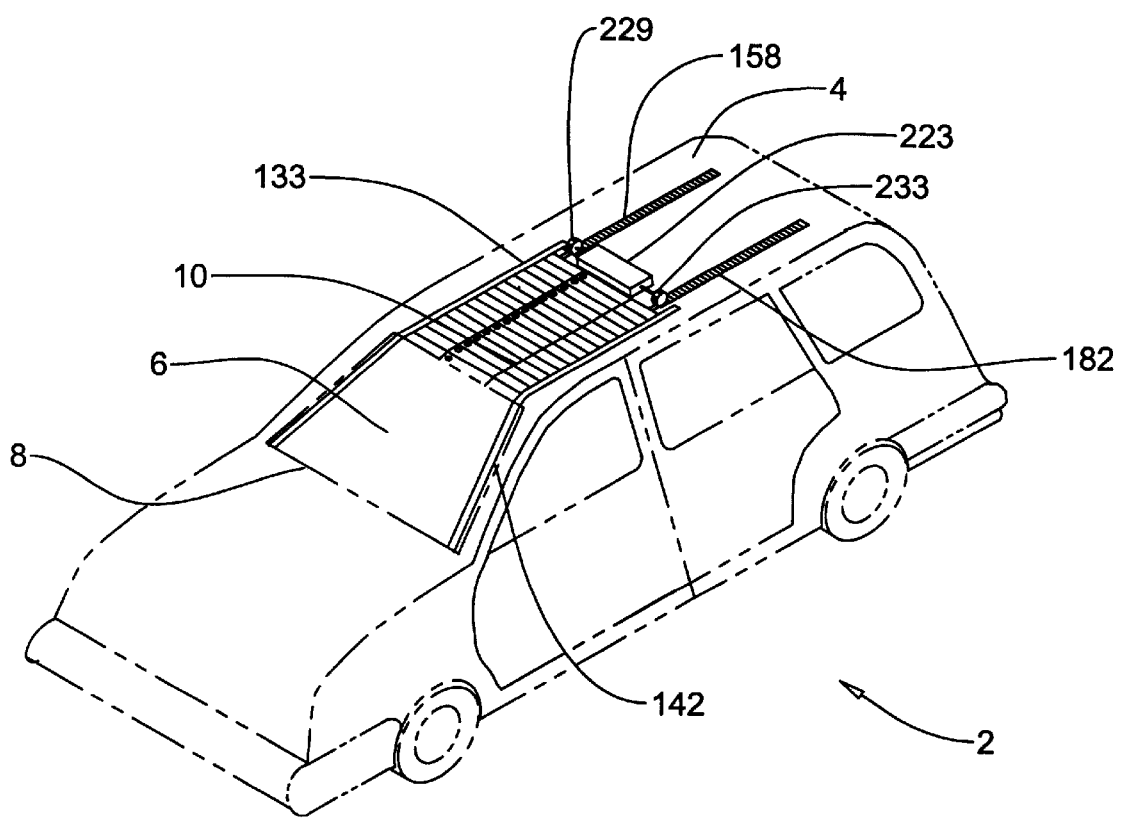
FIG. 1 is an exemplary perspective view of an embodiment of a motor driven sunshield according to the present invention, wherein the sunshield is fully retracted while the ignition key is turned on and the vehicle transmission is in the RUN mode of operation, i.e. drive, neutral, or reverse. Phantom lines denote the vehicle, which is not claimed in the present invention. Shown are the relative positions of the shield assembly, the wheel track assembly, the rack assembly, and the drive assembly.

In an exemplary perspective view, FIG. 1 depicts a motor driven sunshield according to the present invention. Shield assembly 10 is shown fully retracted within roof 4 of automotive vehicle 2, permitting unobstructed vision through windshield 6 for the driver when the ignition key switch is turned on, and the transmission of vehicle 2 is in the RUN mode, that is, Drive, Neutral, or Reverse. Shield assembly 10 is widthwise extensible when deployed to conform to the generally trapezoidal shape of windshield 6, which is encompassed by windshield frame 8. Vehicle 2, including roof 4, roof interior liner 5 (FIG. 35), windshield 6, and windshield frame 8 are illustrated with phantom lines in the figures herewith and are not claimed in the present invention. A typical windshield of a conventional automotive vehicle is wider across the bottom than across the top, consequently, an effective sun shield for a windshield must be capable of configuring to a trapezoidal shape. Effective low-friction mobility for shield assembly 10 during deployment forward and across the interior surface of windshield 6 and subsequent retraction to a position for storage beneath roof 4 by a plurality of wheels confined within first wheel track 133 and second wheel track 142, a first portion of each being proximate to roof 4 and parallel to each other and to the lengthwise axis of vehicle 2, and a second portion of each track splaying outward and downward to conform to the vertical, side portions of frame 8. Retraction and deployment of shield assembly 10 is provided by twin shaft reversible drive motor 223, connected to first pinion 229 and second pinion 233, each in turn connected to first rack 158 and second rack 182, respectively. Each rack is connected to a portion of the shield assembly 10. When the present invention is fully retracted and effectively in storage position, each track is in its rearward most position.

Figure 2:
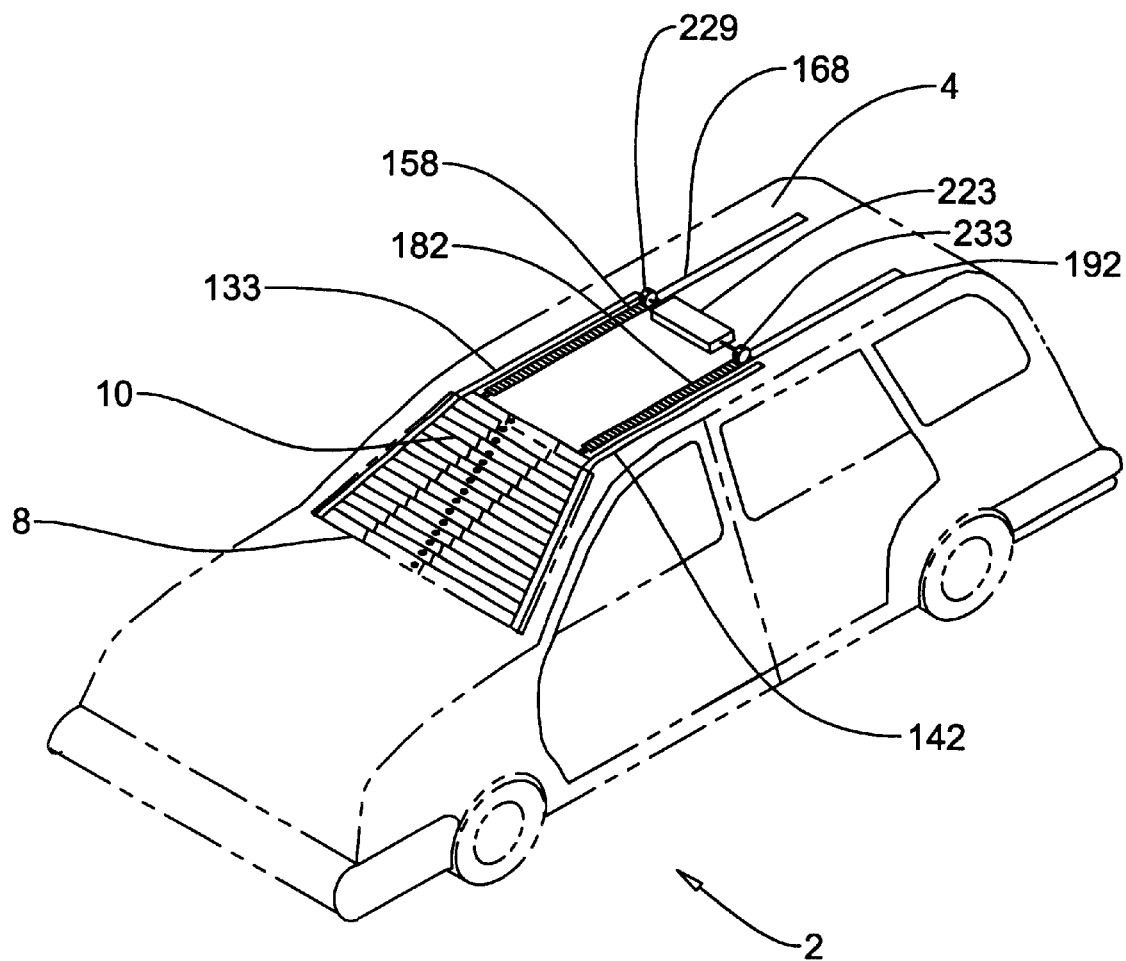
FIG. 2 is an exemplary perspective view of an embodiment of a motor driven sunshield according to the present invention, wherein the sunshield is fully deployed to protect the dashboard and interior of the vehicle from potentially harmful sun rays otherwise passing through the windshield. The present invention may be deployed only when the vehicle transmission is in the PARK mode of operation, i.e. the vehicle is stationary. Phantom lines denote the vehicle, which is not claimed in the present invention. Shown are the relative positions of the shield assembly, the wheel track assembly, the rack and rack guide assembly, and the drive assembly.

FIG. 2 illustrates, in perspective view, an embodiment of the present invention fully deployed, conforming to the generally trapezoidal shape of windshield frame 8 of vehicle 2. Shield assembly 10, has moved from its storage location beneath roof 4 to cover the inner surface of windshield 6 (not shown). In addition to showing elements of the present invention displayed previously in FIG. 1, FIG. 2 introduces first rack guide channel 168 and second rack guide channel 192. These guide channels confine the movement of first rack 158 and second rack 182, respectively, during deployment and retraction of shield assembly 10. As in FIG. 1, motor vehicle 2 is shown in phantom lines. The present invention is intended for installation in the vehicle between the roof 4 and the roof interior liner 5 (not shown, either as original equipment during manufacture or post-manufacture add-on by an automotive specialty shop.

Figure 3:
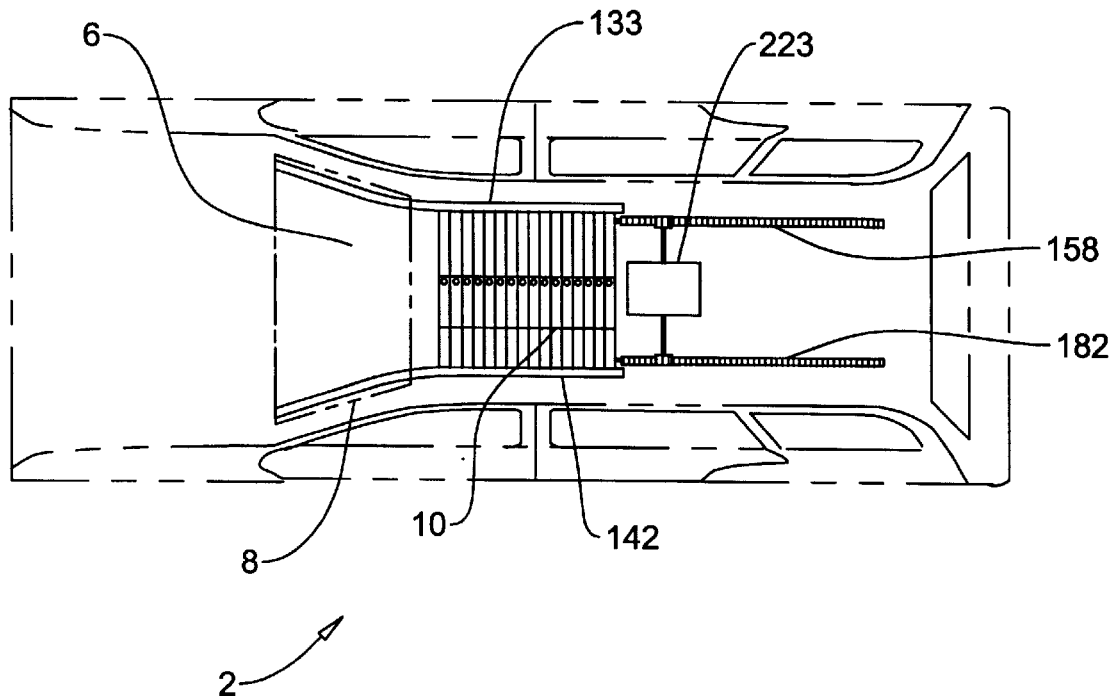
FIG. 3 is an exemplary top view of an embodiment of a motor driven sunshield according to the present invention, wherein the sunshield is fully retracted to permit unobstructed vision while operating the vehicle. Phantom lines denote the vehicle, which is not claimed in the present invention. Shown are the relative positions of the shield assembly, the wheel track assembly, the rack assembly, and the drive assembly.
Figure 4:
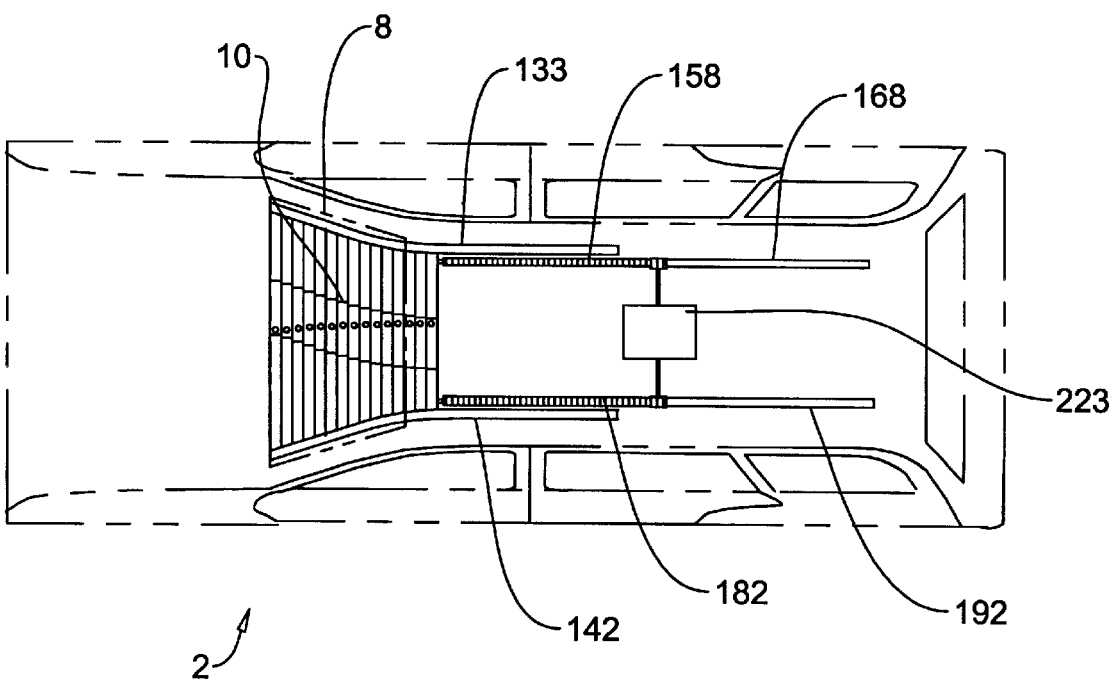
FIG. 4 is an exemplary top view of an embodiment of a motor driven sunshield according to the present invention, wherein the sunshield is fully deployed to protect the dashboard and interior of vehicle from potentially harmful sunrays otherwise passing through the windshield. Phantom lines denote the vehicle, which is not claimed in the present invention. Shown are the relative positions of the shield assembly, the wheel track assembly, the rack and rack guide assembly, and the drive assembly.

Top views of the present invention, illustrating full retraction and full deployment of shield assembly 10, are shown in FIG. 3 and FIG. 4, respectively. These figures clearly depict how the first wheel track 133 and second wheel track 142, initially parallel to each other proximate to and beneath roof 4, splay outward to conform to the side portions of windshield frame 8. During deployment, twin shaft reversible motor 223 urges both first rack 158 and second rack 182 forward, moving and configuring shield assembly 10, connected thereto, covering the interior surface of windshield 6. Movement of first rack 158 is confined to forward or rearward motion by first rack guide channel 168; likewise, second rack 182 is confined by second rack guide channel 192.

The widthwise-extensible shield assembly 10 is fabricated from a plurality of hinged, lengthwise extensible slidable slats, including at least one drive slat 89 FIG. 14), at least one dashboard skirt slat 65 (FIG. 18) and a plurality of intermediate slats 12 (FIG. 5) connected therefrom. Depicted in top (plan) views, FIGS. 5, 6, each intermediate slat 12 has two separable sections; a slot section 14 featuring a first wheel edge 34, a slotted slat upper section 16, having a slot 18, and a slotted slat lower section 20, and a pin section 40. Pin section 40 has a capped slot retaining pin 42 and a second wheel edge 59 (FIG. 6). Details of an intermediate slat 12, illustrated in FIG. 5, show two lengthwise crenelated edges, each edge having a plurality of crenels 24 and a plurality of merlons 26. Typically, the width of each crenel exceeds the width of each merlon. Each merlon has a merlon bore 28, whose axis is parallel with the lengthwise axis of the slat. Each slat additionally features a slot 18 and a cooperative capped slot retaining pin 42, a first wheel edge 34 and a second wheel edge 59. To clarify some of the details, an exploded top view, FIG. 6, depicts separately a slot section 14 and pin section 40. A slot 18 is formed in slotted slat upper section 16. Slotted slat lower section 20 features a slot section first crenelated edge 22 and a slot section second crenelated edge 30. In addition to having a capped slot retaining pin 42 (FIG. 5), pin section 40 similarly features a pin section first crenelated edge 47 and a pin section second crenelated edge 55. Structure of the intermediate slat 12, is further illustrated in side (elevation) view, FIG. 7 and exploded side (elevation) view FIG. 8. These views clearly demonstrate the capability of a portion of pin section 40 to slide underneath slotted slat upper section 16, constrained to close proximity to each other by capped slot retaining pin 42. To clarify the structure of the intermediate slat 12, the plurality of merlon bores is not shown in FIG. 6 and FIG. 8.

Connecting together a plurality of intermediate slats 12 with alternating crenels and merlons of adjacent slats effects fabrication of shield assembly 10. The top (first) intermediate slat is further connected to a drive slat 89 and the bottom (last) intermediate slat is further connected to a dashboard skirt slat 65. FIG. 9 depicts how adjacent slats are connected together with a wheel and dual axle assembly 49, passing through alternating merlon bores of adjacent slats. Wheel and dual axle assembly 49 rotates freely within all merlon bores.

Wheel and dual axle assembly 49, illustrated in FIG. 10 and FIG. 11 extension and compression, respectively, comprises a first wheel 36 connected to a first wheel tubiform axle 38 and a second wheel 61 connected to a second wheel tubiform axle 63. Axle 38 and axle 63 are slidably and rotatably connected with connective axle pintle 64 permitting the two axles to rotate and slide lengthwise, independent of each other. This construction allows lengthwise extension and compression of the wheel and dual axle assembly 49.

When passed through alternating merlon bores 28 of adjacent slats, forming a special hinge, the wheel and axle assembly, in conjunction with the slot 18 and retaining pin 42, and the proportional difference in the width of crenels and merlons, allow simultaneously a lengthwise extensibility and widthwise curvature of the surface of shield assembly 10 to configure and conform to the generally curved, trapezoidal shape of a typical windshield.

Figure 12:
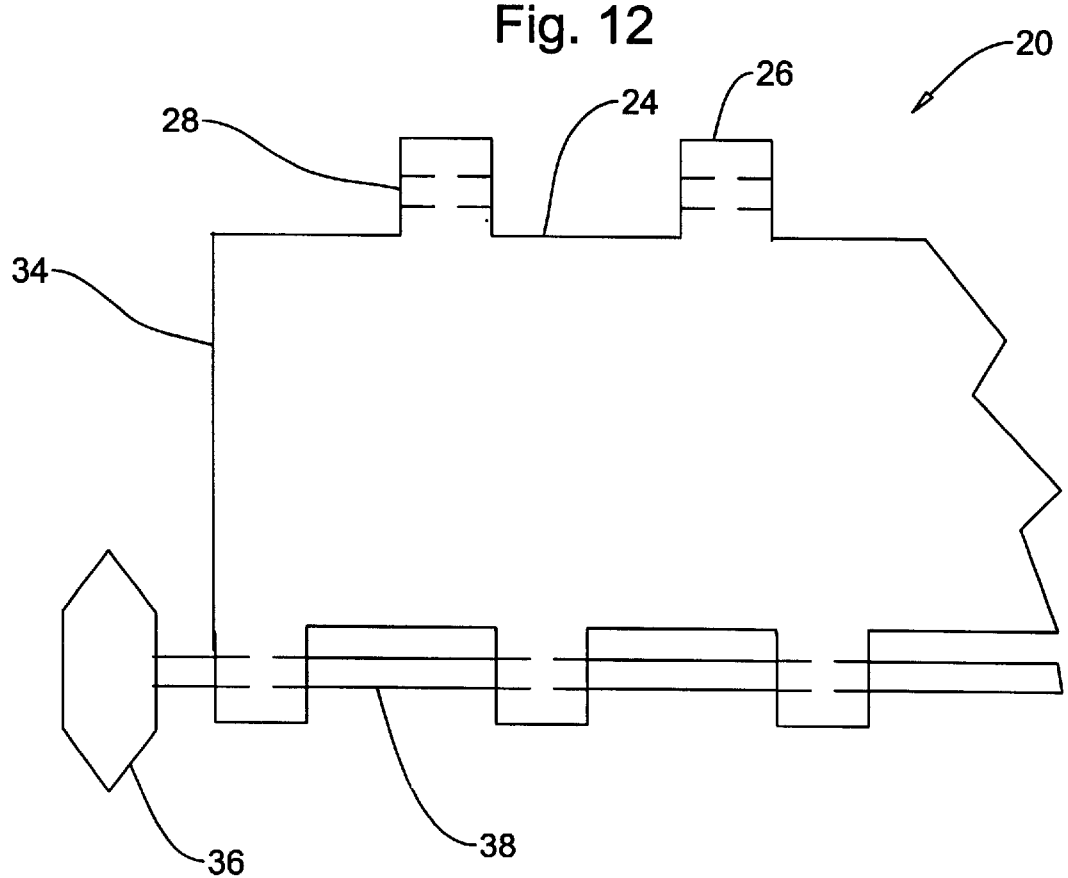
FIG. 12 is an enlarged broken view of the first wheel edge (leftmost portion) of FIG. 5, additionally including a first wheel and associated axle to illustrate how the axle passes through and turns freely within each participating merlon bore of a slat.
Figure 13:
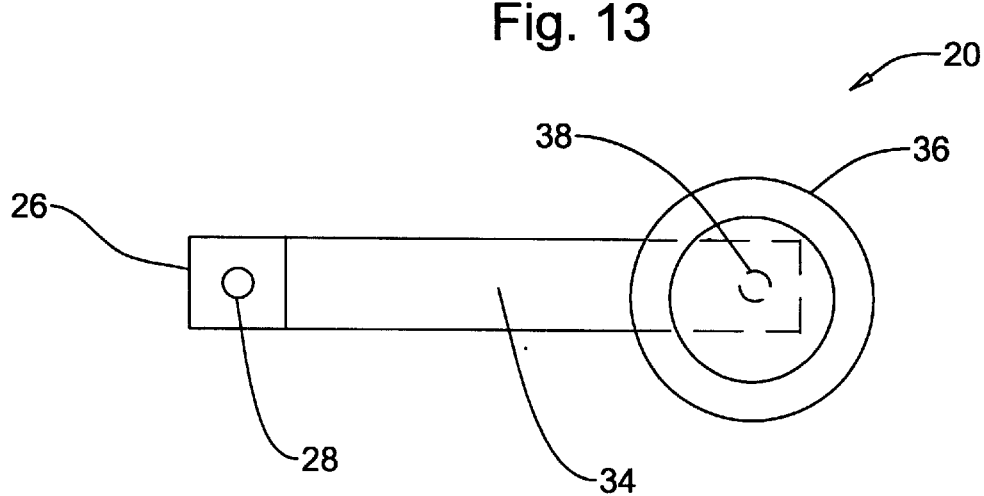
FIG. 13 is an end view of FIG. 12 illustrating a first wheel and a merlon and merlon bore of the second crenelated edge of an intermediate slat.

Further detail of intermediate slat 12 is illustrated in a broken, enlarged top (plan) view (FIG. 12) and end view (left side) (FIG. 13) of slotted slat lower section 20, showing a typical crenel 24, merlon 26, merlon bore 28, first wheel edge 34, first wheel 36, and first wheel tubiform axle 38.

As mentioned hereinbefore, the shield assembly 10 includes a drive slat 89, connected to the top (first) intermediate slat 12, for linkage to a mechanism for deploying assembly 10 across or retracting from the windshield 6 of vehicle 2.

With three important exceptions, drive slat 89, illustrated in assembled top view of FIG. 14 and exploded top view of FIG. 15, is virtually identical to intermediate slat 12. For example, drive slat slot section crenelated edge 99 and drive pin section crenelated edge 121 (FIG. 15) are identical to slot section first crenelated edge 22 (FIG. 6) and pin section first crenelated edge 47 (FIG. 6), respectively. The drive slat 89 and the intermediate slat 12 both feature a plurality of merlon bores 28, merlons 26, and crenels 24. Likewise, both types of slats have a slot 18 and a capped slot retaining pin 42. Drive slot section 91 features drive slat first wheel edge 107 (FIG. 15) corresponding to first wheel edge 34 of intermediate slat 12; likewise, drive slat pin section 113 has a drive slat second wheel edge 123 corresponding to second wheel edge 59 of intermediate slat 12.

The three exceptions are: first, drive slat slotted section outer edge 97 and drive slat pin section outer edge 98 are smooth, in marked contrast to the crenelated edges of slot section second crenelated edge 30 (FIG. 6) and pin section second crenelated edge 55; second, drive slat 89 features a first rack connection mount 109 and a second rack connection mount 125 to facilitate connection to a drive mechanism; and third, a motor control stop rod 111 is attached to drive slot section 91 to de-energize the drive mechanism upon full retraction of shield assembly 10. Details are further clarified in the broken, partial top view of drive slot section 91, FIG. 16, and the broken, partial end (side) view of drive slot section 91, FIG. 17. FIG. 16 and FIG. 17 provide more detail for first rack connection mount 109, showing the mount to be tubiform for receiving a mechanical connection from the drive mechanism and also showing a first wheel 36 and associated first wheel tubiform axle 38 inserted in the merlon bores 28 of merlons 26.

FIG. 18, assembled top view, and FIG. 19, exploded top view, depict the dashboard skirt slat 65, which is attached via a wheel and dual axle assembly 49 (FIG. 10, FIG. 11), to the bottom-most intermediate slat 12 of shield assembly 10. Again, similar to drive slat 89, dashboard skirt slat 65 is virtually identical to intermediate slat 12, with two notable exceptions: first, there is a first skirt section guide pin 78 attached to first skirt section wheel edge 77 and a second skirt section guide pin 88 attached to second skirt section wheel edge 87; second, a pliant dashboard skirt configuring and conforming to the general contour of the dashboard of vehicle 2 is attached to dashboard skirt slat 65. Lower slot section skirt 75 is attached to skirt slotted slat lower section 70; upper slot section skirt 74 is attached to skirt slotted slat upper section 68; and skirt pin section skirt 85 is attached to skirt pin section 79. This configuration allows skirt pin section skirt 85 to slip beneath upper slot section skirt 74 while widthwise extension or compression of shield assembly 10 is occurring. A top (plan) exploded view of dashboard skirt slat 65 is shown in FIG. 19, clearly depicting skirt slot section 67 and skirt pin section 79. First skirt slot lower section skirt edge 73, first skirt slot upper section skirt edge 76, and skirt pin section skirt edge 83 are pliant and contour to fit the general contour of the dashboard when the present invention is fully deployed. Additional detail is provided in the broken, enlarged top of a portion of skirt slotted slat lower section 70, FIG. 20, and the broken, enlarged left-side view, FIG. 21, showing the first skirt section wheel edge 77.

Figure 22:
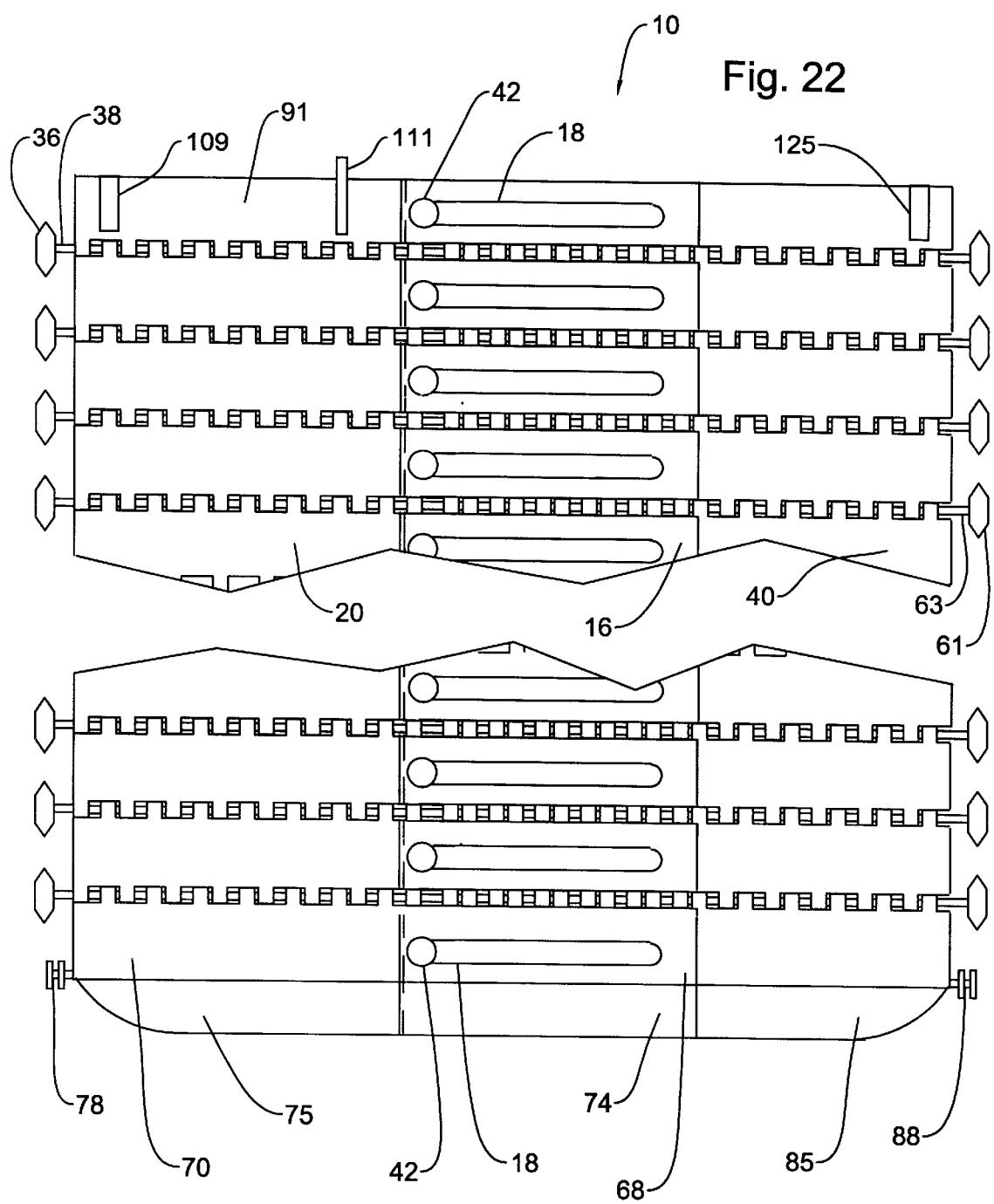
FIG. 22 is an exemplary top view of an embodiment of a motor driven sunshield according to the present invention, illustrating, in retracted position, a sun shield assembly comprising a driver slat assembly, a skirt slat assembly, and a plurality of intermediate slat assemblies interconnected, by a plurality of dual axles, between and to the driver slat assembly and skirt slat assembly. Also illustrated are the associated first and second wheels, with their dual axles, and the guide pins. The retaining pin of each slat assembly lies in a line perpendicular to the principal axis of the slats, confirming the slats and dual axles are in the compressed (retracted) mode. For clarity, the first and second wheel tracks are not shown.

A top (plan) broken view, FIG. 22, of composite shield assembly 10 shows a plurality of interconnected intermediate slats 12, the top intermediate slat connected to a drive slat 89 and the bottom intermediate slat connected to a dashboard skirt slat 65, each such connection effected with a wheel and dual axle assembly 49. In this view the length of each extensible slat is constant, the width of the shield assembly 10 is constant, and the plurality of first wheels, second wheels, and capped slot retaining pins are each in a distinct straight line, parallel to each other, signifying that the shield assembly 10 is in a fully compressed, retracted state.

Conversely, FIG. 23 depicts the shield assembly 10 in a fully extended, deployed state. Here the plurality of first wheels and first skirt section guide pin are confined and hidden within first wheel track 133 and the plurality of second wheels and second skirt section guide pin are confined and hidden within second wheel track 142. These confining wheel tracks, conforming to the two vertical sides of windshield frame 8 (FIG. 3, FIG. 4) urge first dual disk flange guide pin 78, and second dual disk flange guide pin 88 and also the plurality of first and second wheels outward, proportionally extending the width of shield assembly 10 to conform to the general trapezoidal shape of windshield 6. The proportional difference in width between the crenels and merlons, allow each slat to extend lengthwise more than the successive, adjacent, connected slat, immediately following. The line formed by the plurality of capped slot retainer pins 42 is no longer parallel to both the first wheel track 133 and the second wheel track 142.

FIG. 24 (top view) and FIG. 25 (top view) illustrate a rack assembly 156 as an exemplary means for providing a mechanism to move the shield assembly 10 forward during deployment and rearward during retraction, respectively. A plurality of shield mounting pedestal transverse members 153 supports a first rack guide channel 168 and a second rack guide channel 192. First rack guide channel 168 contains and controls the movement of first rack 158; similarly, second rack guide channel 192 contains and controls the movement of second rack 182. Bearing raceway 178 facilitates movement and control of first rack 158; bearing raceway 202 facilitates movement and control of second rack 182. The cut teeth of first rack 158 are operationally engaged with the cut teeth of first pinion 229, this pinion, in turn, is connected to first shaft 227 (FIG. 27) of twin shaft reversible motor 223. Like-wise, the cut teeth of second rack 182 are operationally engaged with the cut teeth of second pinion 233, this pinion, in turn, is connected to second shaft 231 of twin shaft reversible motor 223. Attached to the forward end of first rack 158 and protruding therefrom is first rack drive rod 206. Second rack drive rod 208 is, in like manner, attached to the forward end of second rack 182 and protruding therefrom. Attached to twin shaft reversible drive motor 223 is shield automatic retract limit switch 251 (normally closed) for interrupting electrical power supply to motor 223 when electrical motor control system 243 (FIG. 38) of the present invention is in the automatic retract mode and the shield assembly 10 is fully retracted.

FIG. 26 (top, broken view) shows shield assembly 10 operatively connected to rack assembly 156, wherein first rack drive rod 206 (FIG. 24) is connected to first rack connection mount 109 (FIG. 22, FIG. 14) and second rack drive rod 208 (FIG. 24) is connected to second rack connection mount 125 (FIG. 22, FIG. 14). In this view, shield assembly 10 is fully retracted and motor control stop rod 111 (FIG. 14, FIG. 15) has engaged shield retract limit switch 251 deenergizing drive motor 223, preventing further rearward travel of shield assembly 10 while electrical motor control system 243 is in the automatic retract mode. The plurality of first wheels 36 and first skirt section guide pin 78 are confined and concealed within first wheel track 133; likewise, the plurality of second wheels 61 and second skirt section guide pin 88 are confined and concealed within first wheel track 142.

Figure 27:
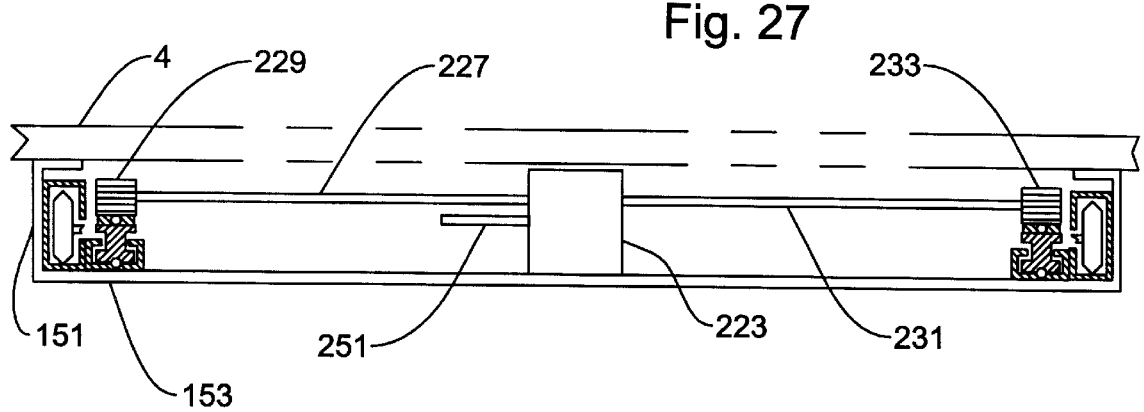
FIG. 27 is a sectional view of FIG. 26, illustrating the dispositional relationships among the drive assembly, rack assembly, wheels, wheel tracks, and shield-mounting pedestal. For clarity, the slat assemblies are not shown.

A sectional view of FIG. 26 is shown in FIG. 27, illustrating how the present invention is disposed beneath the roof 4 (shown in phantom lines) of vehicle 2. This sectional view is toward the rear of the vehicle 2. All components of the composite present invention are securely attached to or mounted upon shield mounting pedestal 151 or its plurality of integral components, shield mounting pedestal transverse member 153. The mounting pedestal 151 is securely and permanently affixed to the interior side of roof 4.

Figure 28:
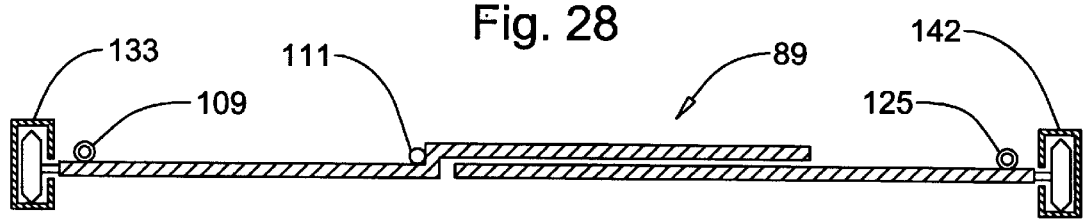
FIG. 28 is a sectional view of FIG. 23, illustrating the dispositional relationship between the shield assembly, wheels, and wheel track assembly. The section occurs behind the slot and retaining pin of the drive slat.

FIG. 28 is a simplified sectional view of FIG. 23, showing a front (elevation) section of drive slat 89 (FIG. 14). Also shown are first rack connection mount 109, second rack connection mount 125, first wheel track 133 and second wheel track 142.

Figure 29:
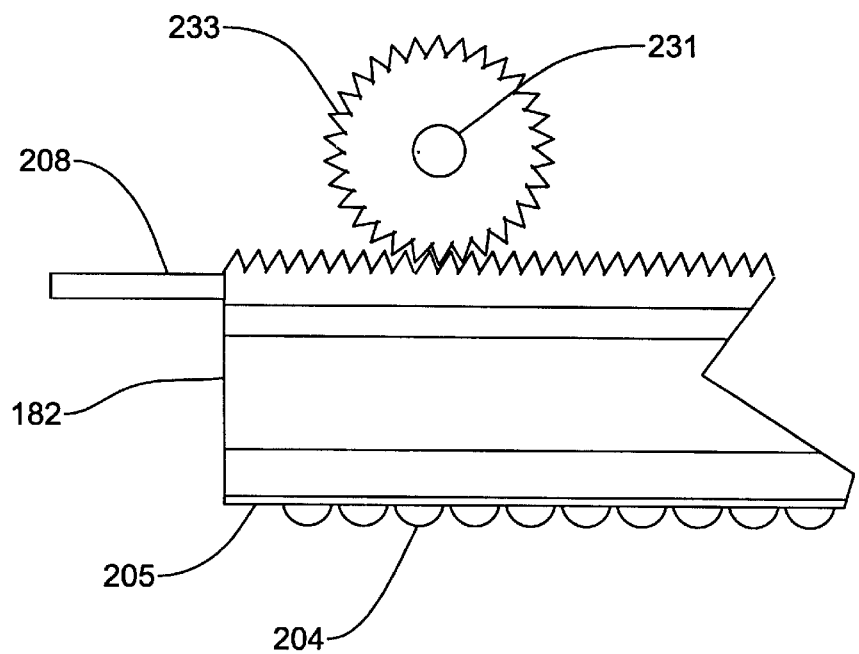
FIG. 29 is a broken view of a second rack, illustrating a second rack drive rod, second pinion, and rack bearing balls.

Details of the relation between rack and pinion are displayed in FIG. 29, a broken, enlarged, elevation view. Second pinion 233 is securely affixed to second shaft 231 of twin shaft reversible drive motor 223. The cut teeth of pinion 233 operatively engage the cut teeth of second rack 182. The bottom of rack 182 features a lengthwise raceway groove for receiving a plurality of rack bearing balls 204, such balls retained in the groove by rack bearing ball retainer 205. Rack 182 additionally possesses a second rack drive rod 208 for connection to second rack connection mount 125 (FIG. 28 and FIG. 23).

FIG. 30, FIG. 31, and FIG. 32 are partial sectional views of FIG. 24, showing exclusively detail of first rack guide channel 168 (FIG. 30), and first rack 158 (FIG. 31), and composite channel and rack (FIG. 32). Channel 168 features a first rack guide channel exterior edge 170, a first rack guide channel exterior flange 171, a first rack guide channel bottom edge 172, a first rack guide channel interior edge 174, a first rack guide channel interior flange 175, a first rack guide channel bottom internal surface 176, and a lengthwise guide channel raceway 178.

In like manner, second rack guide channel 192 (not shown) features a second rack guide channel exterior edge; a second rack guide channel exterior flange, a second rack guide channel bottom edge, a second rack guide channel interior edge, a second rack guide channel interior flange, a second rack guide channel bottom internal surface, and a lengthwise second guide channel raceway 202.

FIG. 31 illustrates a sectional view of first rack 158, featuring a first rack toothed upper edge 160, a first rack exterior edge 162, exhibiting a lengthwise groove, slidably cooperative with exterior flange 171, a first rack interior edge 164, such edge featuring a lengthwise groove slidably cooperative with interior flange 175, and a first rack bottom edge 166. Also shown is rack bearing ball 204 and rack bearing ball retainer 205. In the interest of clarity, the bearing ball is not shown in section.

The sectional view of FIG. 32 shows first rack 158 disposed within the channel of first rack guide channel 168, sliding forward for deployment and rearward for retraction on the plurality of rack bearing balls 204 positioned in guide channel raceway 178.

Depicted in the bottom view of FIG. 33, first rack bottom edge 166 possesses a lengthwise rack raceway to receive a plurality of bearing balls 204 retained in place by rack bearing ball retainer 205.

Drive assembly 221, shown in the broken view of FIG. 34, includes a twin shaft reversible drive motor 223, a first shaft 227 (broken to improve efficacy of FIG. 34) connected to a first pinion 229, a second shaft 231 (also broken in FIG. 34) connected to a second pinion 233, and a shield retract limit switch 251 (normally closed). Motor 223 is powered by electrical motor control system 243, which receives power from the vehicle's electrical system.

Figure 35:
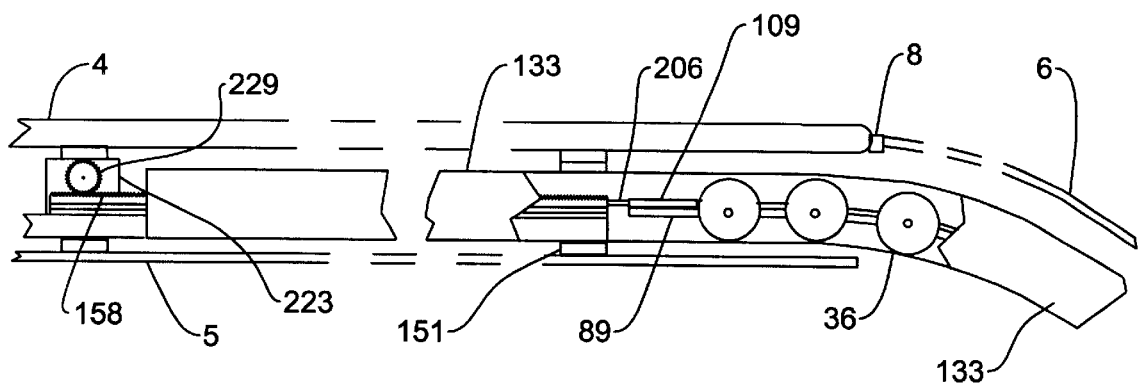
FIG. 35 is an exemplary broken side view of the motor driven sunshield according to the present invention, illustrating the dispositional positioning of the wheels, wheel track assembly, rack assembly, shield assembly, and drive assembly, and their location relative to the roof and interior lining of the vehicle.
Figure 36:
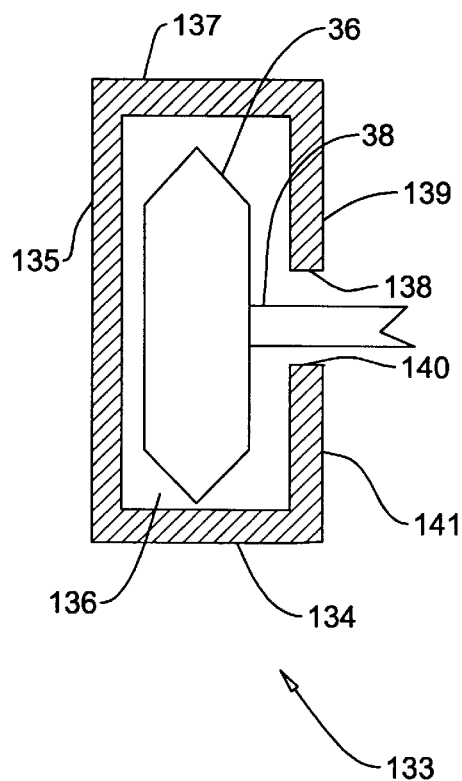
FIG. 36 is an enlarged broken end view of a first wheel track and first wheel of a slat. The track cross section is in the general rectilinear shape of a "C".

FIG. 35 is a broken side view of an embodiment of the present invention, the invention disposed between roof 4 and roof interior liner 5 of vehicle 2 (FIG. 1) (the vehicle 2, including windshield 6, windshield frame 8, roof 4, and roof liner 5 shown in phantom lines and not claimed). All components of the composite present invention are securely affixed to shield mounting pedestal 151 and its associated plurality of shield mounting pedestal transverse members 153 (FIG. 27), which in turn, is securely and permanently attached to the underside of roof 4. First wheel track 133 extends underneath roof 4, windshield 6, and windshield frame 8, providing confinement and guidance of the plurality of first wheels 36 (shown in more detail in FIG. 36), which in turn with companion plurality of second wheels 61 (FIG. 22) similarly confined in second wheel track 142 (FIG. 23), provide efficient mobility to shield assembly 10 during deployment and retraction. The uppermost (most rearward) slat of shield assembly 10 is drive slat 89, having first rack connection mount 109 attached thereto. Mount 109 is connected to first rack drive rod 206, a component of and protruding form first rack 158, whose first rack toothed upper edge 160 engages the cut teeth of first pinion 229. First pinion 229 is powered from twin shaft reversible motor 223, via first shaft 227.

As mentioned hereinbefore, efficient mobility of shield assembly 10 is effected by riding forward during deployment and rearward during retraction on a plurality of first wheels 36 confined within first wheel track 133 and a plurality of second wheels 61 confined within second wheel track 142. Detail of this feature of an embodiment of the present invention is shown in sectional view FIG. 36. Thin-walled and rectilinear, the cross-section of track 133 is formed in the general shape of a "C", the opening of the "C" facing inward toward the longitudinal axis of vehicle 2. First wheel track 133 features an internal volume 136 bounded by first wheel track interior upper edge axle face 138, first wheel track interior upper edge 139, first wheel track upper edge 137, first wheel track exterior edge 135, first wheel track bottom edge 134, first wheel track interior lower edge 141, and first wheel track interior lower edge axle face 140. As demonstrated in FIG. 36, internal volume 136 is sufficient to accommodate a plurality of first wheels 36; and, the spacing between upper edge axle face 138 and lower edge axle face 140 is sufficient to accommodate first wheel tubiform axle 38.

A similar situation exists for second wheel track 142 and second wheel 61. Although not shown in detail, thin-walled and rectilinear, the cross-section of second wheel track 142 is formed in the general shape of a "C", the opening of the "C" facing inward. Second wheel track 142 features a second wheel track interior volume bounded by second wheel track interior upper edge axle face, second wheel track interior upper edge, second wheel track upper edge, second wheel track exterior edge, second wheel track bottom edge, second wheel track interior lower edge, and second wheel track interior lower edge axle face. Similarly, as demonstrated in first wheel track internal volume 136 shown in FIG. 36, second wheel track internal volume is sufficient to accommodate a plurality of second wheels 61; and, the spacing between upper edge axle face and lower edge axle face is sufficient to accommodate second wheel tubiform axle 63.

As mentioned hereinbefore, urging widthwise extension and compression of shield assembly 10 during deployment and retraction, respectively, is accomplished by first dual disk flange guide pin 78 attached to first skirt section wheel edge 77 of skirt slot section 67 and second dual disk flange guide pin 88 attached to second skirt section wheel edge 87 of skirt pin section 79. As first wheel track 133 and second wheel track 142 each curve outward and downward during deployment of shield assembly 10 across the inner surface of windshield 6, captive guide pins 78 and 88 follow the curvature and consequently extend the length of dashboard skirt slat 65 by pulling skirt slot section 67 and skirt pin section 79 away from each other. However skirt slat 65 is slidably connected to one of a plurality of intermediate slats 12 with a wheel and dual axle assembly 49, connecting skirt slot section crenelated edge 71 and skirt pin section crenelated edge 81 to slot section first crenelated edge 22 and pin section first crenelated edge 47. As skirt slat 65 lengthwise extends and slides along the axles of dual axle assembly 49, its merlons 26 engage similar merlons of the attached intermediate slat and urge lengthwise extension of the intermediate slat. Since all slats forming shield assembly 10 are similarly connected, each connected slat progressively responds to the urging of the preceding slat and transmits this urging to the next successive slat.

Figure 37:
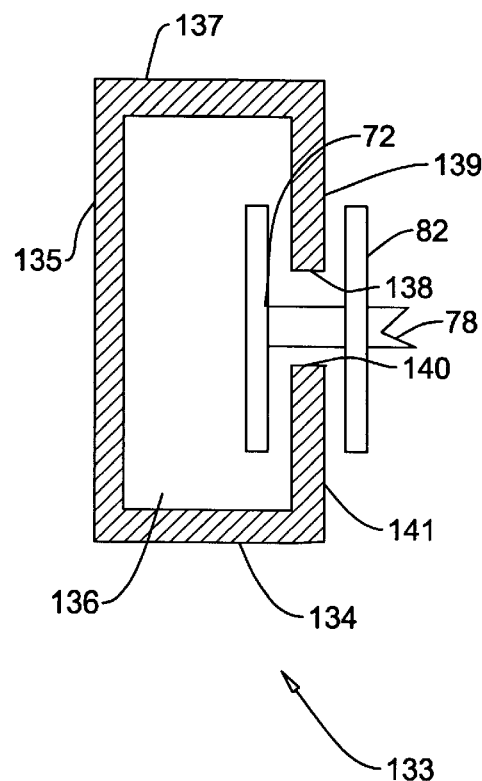
FIG. 37 is an enlarged broken end view of a rectilinear cross section first wheel track and first dual disk flange guide captive therein.

FIG. 37 illustrates how first dual disk flange guide pin 78 is captive of first wheel track 133. The spacing between upper edge axle face 138 and lower edge axle face 140 is sufficient to accommodate the diameter of guide pin 78, but small enough to maintain first interior disk flange 72 within volume 136 and likewise maintain first exterior disk flange 82 exterior to interior upper edge 139 and interior lower edge 141.

An important feature of the present invention is the ability to function automatically, as well as manually, relieving the vehicle's occupants of the responsibility and task of placing a sunshield across the inner face of the windshield and subsequently removing the manually placed shield. Manual operation is also provided to accommodate situations where it is desired to deploy or retract the sunshield. FIG. 38 is an exemplary embodiment of an electrical circuit, electrical motor control system 243, for automatically and manually controlling deployment and retraction of the present invention. All electrical power is supplied by vehicle electrical system 245 and all mechanical movement of the present invention is provided by twin shaft reversible motor 223. Transmission mode sensor and second bimodal switch 247 is connected to electrical system 245 by means of vehicle electrical system circuit 246 and additionally linked to sense the bimodal operating mode of the transmission, that is, PARK or RUN, where RUN includes drive, neutral, and reverse. Typically the vehicle ignition key switch is off when the transmission is in PARK mode and the ignition key switch is on when the transmission is in RUN mode. When the transmission is in PARK mode, second bimodal switch 247 provides electrical power to first bimodal switch and automatic deploy circuit 253 via PARK circuit 249. Initially after turning the ignition key off, the first bimodal momentary contact switch is armed, set and maintained in the DEPLOY mode by the deploy circuit and electrical power is supplied directly to motor 223 via shield deploy circuit 254. Upon full deployment, the automatic deploy circuit interrupts the supply of electrical power to motor 223 and disarms the first bimodal momentary contact switch. Manually pressing the RETRACT portion of the first bimodal switch arms that switch and supplies electrical via second shield retract circuit 255 to motor 223 to retract shield assembly 10. The first bimodal switch remains armed and can be manually utilized to alternately deploy and retract the shield assembly 10 until transmission mode sensor and second bimodal switch 247 detects a change in operating state from PARK mode to RUN mode. When the ignition key is turned on and the transmission is placed in RUN mode, second bimodal switch 247 interrupts power to circuit 249 and instead provides electrical to shield automatic retract limit switch 251 (normally closed) via RUN circuit 248. In turn, limit switch 251 provides electrical power, via first shield retract circuit 252, to motor 223 to retract shield assembly 10. When shield assembly 10 is fully retracted, providing unobstructed vision for the driver of the vehicle, limit switch 251 interrupts the supply of electrical power to motor 223. When the transmission is placed in PARK and the ignition key switched off, second bimodal switch 247 reverts to providing electrical power to PARK circuit 249, initiating automatic deployment of the present invention.

Electrical motor control system 243 can include a security means to prevent unauthorized operation of the present invention. This additional feature could discourage unauthorized use of the motor vehicle by obscuring the vision of an unauthorized driver.

Another embodiment of the present invention concerns a different method for urging lengthwise extension and compression, during deployment and retraction, respectively, of drive slat 89, dashboard skirt slat 65, and the plurality of intermediate slats 12, forming the composite shield assembly 10. In this alternative embodiment, each first wheel 36 is attached to and rotates freely about the outside end its associated first wheel tubiform axle 38. Likewise, each second wheel 61 is attached to and rotates freely about the outside end its associated second wheel tubiform axle 63.

Each first wheel tubiform axle 38 is firmly affixed to and neither rotates nor slides within each merlon bore 28 associated with each merlon 26 associated with slot section first crenelated edge 22 of each intermediate slat 12. In addition, each first wheel tubiform axle 38 also is firmly affixed to and neither rotates nor slides within each merlon bore 28 associated with each merlon 26 associated with drive slat slot section crenelated edge 99 of drive slat 89.

Each second wheel tubiform axle 63 is firmly affixed to and neither rotates nor slides within each merlon bore 28 associated with each merlon 26 associated with pin section first crenelated edge 47 of each intermediate slat 12. In addition, each second wheel tubiform axle 63 also is firmly affixed to and neither rotates nor slides within each merlon bore 28 associated with each merlon 26 associated with drive pin section crenelated edge 121 of drive slat 89.

Conversely, each first wheel tubiform axle 38 and each second wheel tubiform axle 63 freely rotates and slides within each merlon bore 28 associated with each merlon 26 associated with each slot section second crenelated edge 30 and each pin section second crenelated edge 55 of each intermediate slat 12 and also skirt slot section crenelated edge 71 and skirt pin section crenelated edge 81 of dashboard skirt slat 65.

In this alternative embodiment of the present invention, the plurality of first wheels 36 captive within first wheel track 133 and the plurality of second wheels 61 captive within second wheel track 142 will urge lengthwise extension or compression of each associated slat section attached thereto as the wheels move within the confines of the wheel tracks during deployment and retraction of shield assembly 10.

Although only a few exemplary embodiments of the present invention have been described in the exposition hereinbefore, those skilled in the art will readily appreciate that many modifications are possible in the exemplary embodiments without materially departing from the novel teachings and advantages of this invention. Accordingly, all such modifications are intended to be included within the scope of the present invention as defined in the following claims. In the claims, means-plus-functions clauses are intended to cover the structures described herein as performing the recited functions and not only structural equivalents but also equivalent structures.

What is claimed is:

1. A motor driven sunshield for installation in an automotive vehicle having a roof, a transmission, a vehicle electrical system, a dashboard, and a windshield, for shielding the interior of the vehicle from solar radiation otherwise entering through the windshield, said sunshield comprising:

a shield assembly, widthwise extensible, having an lengthwise extensible drive slat, an lengthwise extensible dashboard skirt slat, and a plurality of lengthwise extensible intermediate slats, each of said slats having a first section, said first section featuring an upper section and a lower section, and a second section, a portion thereof proximate said upper section of said first section and slidable thereunder, for providing lengthwise extensibility and compressibility of each said slat, each said first section having a first wheel edge, each said second section having a second wheel edge, each of said slats featuring at least one lengthwise crenelated edge having a plurality of crenels and merlons, the width of said crenels generally more wide than the width of said merlons, each said merlon having a merlon bore, axis of each said bore parallel to longitudinal axis of each said slat, said drive slat further having a first connection mount and a second connection mount, said skirt slat featuring a first skirt section guide pin extending from associated said first wheel edge and a second skirt section guide pin extending from associated said second wheel edge, said guide pins facilitating lengthwise extension and compression of said skirt slats, said skirt slat further having a lengthwise pliant skirt, for readily conforming, upon full sunshield deployment, to the widthwise contour of the vehicle dashboard, said shield assembly further having a plurality of first wheels and second wheels, each said first wheel connected to a first wheel extensible tubiform axle, each said second wheel connected to a second wheel extensible tubiform axle, each said first tubiform axle and said second tubiform axle axially connected with a connective axle pintle, forming an extensible dual axle assembly, each said dual axle assembly, extensibly, rotatably and slidably fitting in each said merlon bore, each said slat interconnected to at least one other of said slats, each said dual axle assembly passing through alternating said merlon bores of adjacent each of said slats, said first wheel extending beyond said first wheel edge of each said first section, said second wheel extending beyond said second wheel edge of each said second section, said shield assembly aggregatively disposed for providing essentially a wheeled, multi-hinged, widthwise extensible sun barrier, for conforming widthwise to the general trapezoidal shape of the vehicle windshield when lengthwise fully deployed, providing a sunshield thereto, said sunshield assembly capable of being lengthwise fully retracted for providing an unobstructed vision for the vehicle driver;

means for maintaining cooperative operation, during widthwise extension and compression of said sunshield assembly, of each said first section and said second section, a portion thereof proximate to said first section and slidable thereunder, of each of said slats;

means for urging-widthwise extension of said sunshield assembly and lengthwise extension of each of said slats during deployment of said motor driven sunshield, and urging widthwise compression of said sunshield assembly and lengthwise compression of each of said slats during retraction of said motor driven sunshield;

means for urging said sunshield assembly forward from retracted position during deployment thereof and rearward from deployed position during retraction thereof; and means for automatically and manually controlling both deployment of said sunshield assembly across the windshield and retraction therefrom, said shield assembly and each of said means cooperatively and aggregatively linked, forming said automatically and manually operated motor driven sunshield for covering the interior surface of the windshield of the vehicle, protecting the vehicle's interior from potentially harmful solar radiation otherwise passing through the windshield.

2. A motor driven sunshield as recited in claim 1, wherein said driver slat, said dashboard skirt slat and said plurality of intermediate slats are formed from a material selected from a group consisting of polycarbonates, plastics, non-ferrous metal, and ferrous metal.

3. A motor driven sunshield as recited in claim 2, wherein said lengthwise pliant skirt includes an upper first section skirt, a lower first section skirt, and a second section skirt.

4. A motor driven sunshield as recited in claim 3, wherein means for urging widthwise extension of said sunshield assembly and lengthwise extension of each of said slats during deployment of said motor driven sunshield, and urging widthwise compression of said sunshield assembly and lengthwise compression of each of said slats during retraction of said motor driven sunshield comprises:

a wheel track assembly having a first wheel track and a second wheel track, each said track adapted to span the roof interior and windshield frame on each side of the vehicle and conforming thereto, said first wheel track receiving and confining each said first wheel therein, said second wheel track receiving and confining each said second wheel therein, each said first wheel track and said second wheel track featuring a channel cross-section rectilinearly formed in the general shape of a "C", each said track having a wheel track bottom edge, each said track having a wheel track exterior edge connected thereto, each said track having a wheel track upper edge connected to each said exterior edge, each said track having a wheel track interior upper edge connected to said upper edge, each said wheel track interior upper edge featuring a wheel track interior upper edge axle face, each said track having a wheel track interior lower edge, each said interior lower edge featuring a wheel track interior lower edge axle face, each said track having a wheel track interior volume, each of said plurality of said first wheels and said second wheels confined therein, said interior upper edge axle face and said interior lower edge axle face of each said track positioned to permit one of each said tubiform axles to project between, said wheel track assembly conformed both vertically and horizontally for urging widthwise extension of said shield assembly for covering the generally trapezoidal interior surface of the windshield during deployment of said motor driven sunshield and for urging widthwise compression of said shield assembly during retraction and storage of said motor driven sunshield, said wheel track assembly securely affixed to a shield mounting pedestal, said mounting pedestal featuring a plurality of mounting pedestal transverse members, said mounting pedestal adapted to be proximate to roof interior surface and adapted to be permanently and securely affixed thereto.

5. A motor driven sunshield as recited in claim 4, wherein means for urging said sunshield assembly forward during deployment thereof and rearward during retraction thereof comprises:

a rack assembly having a first rack, a first rack guide channel, a first rack drive rod, a second rack, a second rack guide channel, a second rack drive rod, each of said first and second racks having an toothed upper edge featuring cut gear teeth, each of said first and second racks having both an interior edge and a exterior edge, each of said first and second racks having a bottom edge, each said bottom edge having a lengthwise groove, said grove filled with a plurality of ball bearings, said plurality of ball bearings retained within said groove with a bearing ball retainer, said first rack slidably confined within said first rack guide, said second rack slidably confined within said second rack guide, each of said first and second rack guides having both an interior and an exterior edge, each said interior and exterior edge featuring a flange for confining each said first rack and said second rack within said first rack guide and said second rack guide, respectively, each said first rack guide and second rack guide having a bottom interior surface featuring a raceway for receiving said plurality of ball bearings maintained within each said first rack and said second rack, for efficient slidability between said first and second racks and associated said first and second rack guides, said first and second rack guides securely and permanently affixed to said plurality of mounting pedestal transverse members; and a drive assembly having a twin shaft reversible motor, a motor control limit switch, normally closed, attached therewith, said motor featuring a first shaft and a second shaft, said first shaft having a first pinion securely attached thereto, said second shaft having a second pinion securely attached thereto, said first pinion having cut gear teeth for operable association with said first rack, said second pinion having cut gear teeth for operable association with said second rack, said motor operating exclusively in the deploy mode when angular rotation of each said first and second shaft causes each said first rack and second rack to advance lengthwise toward the windshield of the vehicle, said motor operating exclusively in the retract mode when angular rotation of each said first and second shaft causes each said first rack and second rack to withdraw lengthwise away from the windshield of the vehicle, for providing a lengthwise motive force to deploy and retract said motor driven sunshield, said drive assembly securely affixed to said shield mounting pedestal and plurality of mounting pedestal transverse members, said mounting pedestal securely affixed to interior surface of roof of the vehicle.

6. A motor driven sunshield as recited in claim 5, wherein means for automatically and manually controlling deployment of said sunshield assembly across the windshield and retraction therefrom comprises:

an electrical motor control system, having, a first bimodal momentary contact switch, said first switch including an automatic deploy circuit and deploy limit mechanism, a shield retract limit switch for disrupting electrical power to said reversible motor when said motor driven sunshield is fully retracted from the windshield, a transmission mode sensor, said sensor including a second bimodal switch, said mode sensor adapted to be operatively and cooperatively linked to the motor vehicle transmission for detecting a vehicle transmission operating mode, wherein the operating mode is selected from a group consisting of drive, reverse, neutral, and park, said second bimodal switch adapted to be electrically connected to the vehicle electrical system with a vehicle electrical system circuit, said vehicle electrical system circuit cooperatively connected and operating in conjunction with an ignition key system of the motor vehicle, said second bimodal switch exclusively operably connected in series with a park circuit to said first bimodal switch, and providing electrical power thereto when said transmission mode sensor detects park mode, said second bimodal switch exclusively operably connected in series with a run circuit and said motor control limit switch when said transmission mode sensor detects other than park mode, said shield retract limit switch, normally closed, operably connected in series with a first shield retract circuit to retract mode circuitry of said reversible motor for providing electrical power to retract said motor driven sunshield, said control limit switch opening and disrupting flow of electrical power to said motor when said sunshield is fully retracted, said first bimodal switch operably electrically connected in series with a shield deploy circuit to deploy mode circuitry of said reversible motor for providing electrical power to deploy said motor driven sunshield when said first bimodal switch is in deploy mode and vehicle transmission is in park mode, said first bimodal switch operably electrically connected in series with a second shield retract circuit to retract mode circuitry of said reversible motor for providing electrical power to retract said motor driven sunshield when said first bimodal switch is in retract mode and vehicle transmission is in park mode, said first switch automatically deploying said motor driven sunshield until said deploy limit mechanism engaged and operating in a momentary retract mode thereafter, for providing both manual and automatic deployment and retraction of said motor driven sunshield installed in an automotive vehicle having a transmission and a windshield, for protecting the interior of the vehicle from solar radiation entering through the windshield.

7. A motor driven sunshield as recited in claim 6, wherein means for maintaining cooperative operation, during widthwise extension and compression of said sunshield assembly, of each said first section and said second section, a portion thereof proximate to said first section and slidable thereunder, of each of said slats comprises:

a slot and pin configuration wherein each said first section is configured as a slot section and each said second section is configured as a pin section, a portion thereof proximate said slot section and slidable thereunder, each said slot section having an lengthwise elongated closed slot, each said pin section having a capped slot retaining pin, said slot retaining pin engaging said slot for maintaining slidable cooperative operation between said slot section and said pin section for each of said slats of said shield assembly; and wherein, said drive slat slot section features a lengthwise drive slat slot section first edge and a lengthwise drive slat slot section crenelated edge and said drive slat pin section features a lengthwise drive slat pin section first edge and a lengthwise drive slat pin section crenelated edge, said intermediate slat slot section features a lengthwise intermediate slat slot section first crenelated edge and a lengthwise intermediate slat slot section second crenelated edge and said intermediate slat pin section features a lengthwise intermediate slat pin section first crenelated edge and a lengthwise intermediate slat pin section second crenelated edge, said dashboard skirt slat slot section features a lengthwise skirt slat slot section crenelated edge and a lengthwise skirt slat slot section skirt edge and said dashboard skirt slat pin section features a lengthwise skirt slat pin section crenelated edge and a lengthwise skirt slat pin section skirt edge.

8. A motor driven sunshield as recited in claim 7, wherein each said first skirt section guide pin and said second skirt section guide pin have an interior disk flange and an exterior disk flange disposed thereon, each said interior disk flange associated with one of each said wheel tracks and captive within, each said exterior disk flange associated with one of each said wheel tracks and maintained without, said flanges following the contour of each said wheel track for urging lengthwise extension and compression of said dashboard skirt slat and said plurality of each said intermediate slat aggregatively connected thereto.

9. A motor driven sunshield as recited in claim 7, wherein each said first wheel rotates freely about each said associated first wheel tubiform axle and additionally firmly attached thereto, each said first wheel tubiform axle firmly attached and non-rotating within said merlon bores of each associated said slot section first crenelated edge, each said second wheel rotates freely about each said associated second wheel tubiform axle and additionally firmly attached thereto, each said second wheel tubiform axle firmly attached and non-rotating within said merlon bores of each associated said pin section first crenelated edge, each of said first wheels and second wheels captive within each associated said wheel track for urging lengthwise extension and compression of said plurality of each said intermediate slat aggregatively connected thereto.

10. A motor driven sunshield for installation in an automotive vehicle having a windshield, for protecting the interior of the vehicle from solar radiation otherwise entering through the windshield, said motor driven sunshield comprising:

a shield assembly, widthwise extensible, having an lengthwise extensible drive slat, an lengthwise extensible dashboard skirt slat, and a plurality of lengthwise extensible intermediate slats, each said slat having a slot section and a pin section, a portion thereof proximate said slot section and slidable thereunder, each said slot section having an lengthwise elongated closed slot, each said pin section having a capped slot retaining pin, said slot retaining pin engaging said slot for maintaining slidable cooperative operation between said slot section and said pin section for each of said slats of said shield assembly, each said slot section having a first wheel edge, each said pin section having a second wheel edge, each of said slats featuring at least one lengthwise crenelated edge having a plurality of crenels and merlons, the width of said crenels generally not equal to the width of said merlons, each said merlon having a merlon bore parallel to length of each said slat therethrough, said drive slat further having a first connection mount and a second connection mount, said dashboard skirt slat featuring a first skirt section guide pin extending from associated said first wheel edge and a second skirt section guide pin extending from associated said second wheel edge, each said guide pin facilitating extension and compression of said slats during deployment and retraction, said dashboard skirt slat further having a lengthwise pliant skirt, readily conforming, upon full sunshield deployment, to the widthwise contour of the vehicle dashboard, said shield assembly further having a plurality of first wheels and second wheels, each said first wheel connected to a first wheel extensible tubiform axle, each said second wheel connected to a second extensible tubiform axle, said first tubiform axle and said second tubiform axle axially connected with a connective axle pintle, forming an extensible dual axle assembly, each said dual axle assembly, extensibly, rotatably and slidably fitting in each said merlon bore, each of said slats interconnected to at least one other of said slats, each said dual axle assembly passing through alternating said merlon bores of adjacent said crenelated edge of each of said slats, said first wheel extending beyond said first wheel edge of each said slot section, said second wheel extending beyond said second wheel edge of each said pin section, providing essentially a multi hinged, widthwise extensible sun barrier, for conforming widthwise to the general trapezoidal shape of the vehicle windshield when fully deployed, providing a sun shielding thereto, said sunshield assembly capable of being lengthwise fully retracted to provide unobstructed vision for the vehicle driver;

a wheel track assembly having a first wheel track and a second wheel track, each laterally disposed in the vehicle, spanning the roof interior and windshield frame on each side of the vehicle and conforming thereto, said first wheel track receiving and confining each said first wheel therein, said second wheel track receiving and confining each said second wheel therein, each said first wheel track and said second wheel track featuring a channel cross-section rectilinearly formed in the general shape of a "C", each said track having a wheel track bottom edge, each said track having a wheel track exterior edge connected thereto, each said track having a wheel track upper edge connected to each said exterior edge, each said track having a wheel track interior upper edge connected to said upper edge, each said wheel track interior upper edge featuring a wheel track interior upper edge axle face, each said track having a wheel track interior lower edge, each said interior lower edge featuring a wheel track interior lower edge axle face, each said track having a wheel track interior volume, each of said plurality of said first wheels and said second wheels confined therein, said interior upper edge axle face and said interior lower edge axle face of each said track positioned to permit each said tubiform axle to project between, said wheel track assembly conformed for urging widthwise extension of said shield assembly for covering the generally trapezoidal interior surface of the windshield during deployment of said motor driven sunshield and for urging widthwise compression of said shield assembly during retraction and storage of said motor driven sunshield, said wheel track assembly securely affixed to a shield mounting pedestal, said mounting pedestal featuring a plurality of mounting pedestal transverse members, said mounting pedestal adapted to be proximate to a roof interior surface and adapted to be permanently and securely affixed thereto;

means for urging said sunshield assembly forward from retracted position during deployment thereof and rearward from deployed position during retraction thereof; and means for automatically and manually controlling both deployment of said sunshield assembly across the windshield and retraction therefrom, said shield assembly, said wheel track assembly, and each of said means cooperatively and aggregatively linked, forming said automatically and manually operated motor driven sunshield for covering the interior surface of the windshield of the vehicle, for protecting the vehicle's interior from potentially harmful solar radiation otherwise passing through the windshield.

11. A motor driven sunshield as recited in claim 10, wherein said driver slat, said dashboard skirt slat and said plurality of intermediate slats are formed from a material selected from a group consisting of polycarbonates, plastics, non-ferrous metal, and ferrous metal.

12. A motor driven sunshield as recited in claim 11, wherein means for urging said sunshield assembly forward during deployment thereof and rearward during retraction thereof comprises:

a rack assembly having a first rack, a first rack guide channel, a first rack drive rod, a second rack, a second rack guide channel, a second rack drive rod, each of said first and second racks having an toothed upper edge featuring cut gear teeth, each of said first and second racks having both an interior edge and a exterior edge, each of said first and second racks having a bottom edge, each said bottom edge having a lengthwise groove, said grove filled with a plurality of ball bearings, said plurality of ball bearings retained within said groove with a bearing ball retainer, said first rack slidably confined within said first rack guide, said second rack slidably confined within said second rack guide, each of said first and second rack guides having both an interior and an exterior edge, each said interior and exterior edge featuring a flange for confining each said first rack and said second rack within said first rack guide and said second rack guide, respectively, each said first rack guide and second rack guide having a bottom interior surface featuring a raceway for receiving said plurality of ball bearings maintained within each said first rack and said second rack, for efficient slidability between said first and second racks and associated said first and second rack guides, said first and second rack guides securely and permanently affixed to said plurality of mounting pedestal transverse members; and a drive assembly having a twin shaft reversible motor, a motor control limit switch, normally closed, attached therewith, said motor featuring a first shaft and a second shaft, said first shaft having a first pinion securely attached thereto, said second shaft having a second pinion securely attached thereto, said first pinion having cut gear teeth for operable association with said first rack, said second pinion having cut gear teeth for operable association with said second rack, said motor operating exclusively in the deploy mode when angular rotation of each said first and second shaft causes each said first rack and second rack to advance lengthwise toward the windshield of the vehicle, said motor operating exclusively in the retract mode when angular rotation of each said first and second shaft causes each said first rack and second rack to withdraw lengthwise away from the windshield of the vehicle, for providing a lengthwise motive force to deploy and retract said motor driven sunshield, said drive assembly securely affixed to said shield mounting pedestal and plurality of mounting pedestal transverse members, said mounting pedestal adapted to be securely affixed to the roof interior surface of the vehicle.

13. A motor driven sunshield as recited in claim 12, wherein means for automatically and manually controlling deployment of said sunshield assembly across the windshield and retraction therefrom comprises:

an electrical motor control system, having, a first bimodal momentary contact switch, said first switch including an automatic deploy circuit and deploy limit mechanism, a shield retract limit switch for disrupting electrical power to said reversible motor when said motor driven sunshield is fully retracted from the windshield, a transmission mode sensor, said sensor including a second bimodal switch, said mode sensor adapted to be operatively and cooperatively linked to the motor vehicle transmission for detecting a vehicle transmission operating mode, wherein the operating mode is selected from a group consisting of drive, reverse, neutral, and park, said second bimodal switch adapted to be electrically connected to the vehicle electrical system with a vehicle electrical system circuit, said vehicle electrical system circuit cooperatively connected and operating in conjunction with an ignition key system of the motor vehicle, said second bimodal switch exclusively operably connected in series with a park circuit to said first bimodal switch, and providing electrical power thereto when said transmission mode sensor detects park mode, said second bimodal switch exclusively operably connected in series with a run circuit and said motor control limit switch when said transmission mode sensor detects other than park mode, said shield retract limit switch, normally closed, operably connected in series with a first shield retract circuit to retract mode circuitry of said reversible motor for providing electrical power to retract said motor driven sunshield, said control limit switch opening and disrupting flow of electrical power to said motor when said sunshield is fully retracted, said first bimodal switch operably electrically connected in series with a shield deploy circuit to deploy mode circuitry of said reversible motor for providing electrical power to deploy said motor driven sunshield when said first bimodal switch is in deploy mode and vehicle transmission is in park mode, said first bimodal switch operably electrically connected in series with a second shield retract circuit to retract mode circuitry of said reversible motor for providing electrical power to retract said motor driven sunshield when said first bimodal switch is in retract mode and vehicle transmission is in park mode, said first switch automatically deploying said motor driven sunshield until said deploy limit mechanism engaged and operating in a momentary retract mode thereafter, for providing both manual and automatic deployment and retraction of said motor driven sunshield in an automotive vehicle having a transmission and a windshield, for protecting the interior of the vehicle from solar radiation entering through the windshield.

14. A motor driven sunshield as recited in claim 13, wherein each said first skirt section guide pin and said second skirt section guide pin have an interior disk flange and an exterior disk flange disposed thereon, each said interior disk flange associated with one of each said wheel tracks and captive within, each said exterior disk flange associated with one of each said wheel tracks and maintained without, said flanges following the channel contour of each said wheel track for urging lengthwise extension and compression of said dashboard skirt slat and each said intermediate slat aggregatively connected thereto.

15. A motor driven sunshield as recited in claim 13, wherein each said first wheel rotates freely about each said associated first wheel tubiform axle and additionally firmly attached thereto, each said first wheel tubiform axle firmly attached and non-rotating within said merlon bores of each associated said slot section first crenelated edge, each said second wheel rotates freely about each said associated second wheel tubiform axle and additionally firmly attached thereto, each said second wheel tubiform axle firmly attached and non-rotating within said merlon bores of each associated said pin section first crenelated edge, each of said first wheels and second wheels captive within each associated said wheel track for urging lengthwise extension and compression of each said intermediate slat aggregatively connected thereto.

16. A motor driven sunshield installed in an automotive vehicle having a windshield, for shielding the interior of the vehicle from rays of the sun otherwise entering through the windshield, said motor driven sunshield comprising:

a shield assembly, widthwise extensible, having an lengthwise extensible drive slat, an lengthwise extensible dashboard skirt slat, and a plurality of lengthwise extensible intermediate slats, each said slat having a slot section and a pin section, a portion thereof proximate said slot section and slidable thereunder, each said slot section having an lengthwise elongated closed slot, each said pin section having a capped slot retaining pin, said slot retaining pin engaging said slot for maintaining slidable cooperative operation between said slot section and said pin section for each of said slats of said shield assembly, each said slot section having a first wheel edge, each said pin section having a second wheel edge, each of said slats featuring at least one lengthwise crenelated edge having a plurality of crenels and merlons, the width of said crenels generally not equal to the width of said merlons, each said merlon having a merlon bore parallel to lengthwise axis of each said slat, said drive slat further having a first rack connection mount and a second rack connection mount, said dashboard skirt slat featuring a first skirt section guide pin extending from associated said first wheel edge and a second skirt section guide pin extending from associated said second wheel edge, said dashboard skirt slat further having a lengthwise pliant skirt, readily conforming, upon full sunshield deployment, to the widthwise contour of the vehicle dashboard, said shield assembly further having a plurality of first wheels and second wheels, each said first wheel connected to a first wheel extensible tubiform axle, each said second wheel connected to a second extensible tubiform axle, said first tubiform axle and said second tubiform axle axially connected with a connective axle pintle, forming an extensible dual axle assembly, each said dual axle assembly, extensibly, rotatably and slidably fitting in each said merlon bore, each of said slats interconnected to at least one other of said slats, each said dual axle assembly passing through alternating said merlon bores of adjacent said at least one crenelated edge of each of said slats, said first wheel extending beyond said first wheel edge of each said slot section, said second wheel extending beyond said second wheel edge of each said pin section, providing essentially a multi hinged, widthwise extensible sun barrier, conforming widthwise to the general trapezoidal shape of the vehicle windshield when fully deployed, providing a sun shielding thereto, said sunshield assembly capable of being lengthwise fully retracted to provide unobstructed vision for the vehicle driver, said driver slat, said dashboard skirt slat and said plurality of intermediate slats formed from a material selected from a group consisting of polycarbonates, plastics, non-ferrous metal, and ferrous metal;

a wheel track assembly having a first wheel track and a second wheel track, each laterally spanning the roof interior and windshield frame on each side of the vehicle and conforming thereto, said first wheel track receiving and confining each said first wheel therein, said second wheel track receiving and confining each said second wheel therein, each said first wheel track and said second wheel track featuring a channel cross-section rectilinearly formed in the general shape of a "C", each said track having a wheel track bottom edge, each said track having a wheel track exterior edge connected thereto, each said track having a wheel track upper edge connected to each said exterior edge, each said track having a wheel track interior upper edge connected to said upper edge, each said wheel track interior upper edge featuring a wheel track interior upper edge axle face, each said track having a wheel track interior lower edge, each said interior lower edge featuring a wheel track interior lower edge axle face, each said track having a wheel track interior volume, each of said plurality of said first wheels and said second wheels confined therein, said interior upper edge axle face and said interior lower edge axle face of each said track positioned to permit each said tubiform axle to project between, said wheel track assembly conformed for urging widthwise extension of said shield assembly for covering the generally trapezoidal interior surface of the windshield during deployment of said motor driven sunshield and for urging widthwise compression of said shield assembly during retraction and storage of said motor driven sunshield, said wheel track assembly securely affixed to a shield mounting pedestal, said mounting pedestal featuring a plurality of mounting pedestal transverse members, said mounting pedestal proximate to roof interior surface and permanently and securely affixed thereto;

a rack assembly having a first rack, a first rack guide channel, a first rack drive rod, a second rack, a second rack guide channel, a second rack drive rod, each of said first and second racks having an toothed upper edge featuring cut gear teeth, each of said first and second racks having both an interior edge and a exterior edge, each of said first and second racks having a bottom edge, each said bottom edge having a lengthwise groove, said grove filled with a plurality of ball bearings, said plurality of ball bearings retained within said groove with a bearing ball retainer, said first rack slidably confined within said first rack guide, said second rack slidably confined within said second rack guide, each of said first and second rack guides having both an interior and an exterior edge, each said interior and exterior edge featuring a flange for confining each said first rack and said second rack within said first rack guide and said second rack guide, respectively, each said first rack guide and second rack guide having a bottom interior surface featuring a raceway for receiving said plurality of ball bearings maintained within each said first rack and said second rack, for efficient slidability between said first and second racks and associated said first and second rack guides, said first and second rack guides securely and permanently affixed to said plurality of mounting pedestal transverse members;

a drive assembly having a twin shaft reversible motor, a motor control limit switch, normally closed, attached therewith, said motor featuring a first shaft and a second shaft, said first shaft having a first pinion securely attached thereto, said second shaft having a second pinion securely attached thereto, said first pinion having cut gear teeth for operable association with said first rack, said second pinion having cut gear teeth for operable association with said second rack, said motor operating exclusively in the deploy mode when angular rotation of each said first and second shaft causes each said first rack and second rack to advance lengthwise toward the windshield of the vehicle, said motor operating exclusively in the retract mode when angular rotation of each said first and second shaft causes each said first rack and second rack to withdraw lengthwise away from the windshield of the vehicle, for providing a lengthwise motive force to deploy and retract said motor driven sunshield, said drive assembly securely affixed to said shield mounting pedestal and plurality of mounting pedestal transverse members, said mounting pedestal securely affixed to interior surface of roof of the vehicle; and an electrical motor control system, having, a first bimodal momentary contact switch, said first switch including an automatic deploy circuit and deploy limit mechanism, a shield retract limit switch for disrupting electrical power to said reversible motor when said motor driven sunshield is fully retracted from the windshield, a transmission mode sensor, said sensor including a second bimodal switch, said mode sensor operatively and cooperatively linked to the motor vehicle transmission for detecting a vehicle transmission operating mode, wherein the operating mode is selected from a group consisting of drive, reverse, neutral, and park, said second bimodal switch electrically connected to the vehicle electrical system with a vehicle electrical system circuit, said vehicle electrical system circuit cooperatively connected and operating in conjunction with an ignition key system of the motor vehicle, said second bimodal switch exclusively operably connected in series with a park circuit to said first bimodal switch, and providing electrical power thereto when said transmission mode sensor detects park mode, said second bimodal switch exclusively operably connected in series with a run circuit and said motor control limit switch when said transmission mode sensor detects other than park mode, said shield retract limit switch, normally closed, operably connected in series with a first shield retract circuit to retract mode circuitry of said reversible motor for providing electrical power to retract said motor driven sunshield, said control limit switch opening and disrupting flow of electrical power to said motor when said sunshield is fully retracted, said first bimodal switch operably electrically connected in series with a shield deploy circuit to deploy mode circuitry of said reversible motor for providing electrical power to deploy said motor driven sunshield when said first bimodal switch is in deploy mode and vehicle transmission is in park mode, said first bimodal switch operably electrically connected in series with a second shield retract circuit to retract mode circuitry of said reversible motor for providing electrical power to retract said motor driven sunshield when said first bimodal switch is in retract mode and vehicle transmission is in park mode, said first switch automatically deploying said motor driven sunshield until said deploy limit mechanism engaged and operating in a momentary retract mode thereafter, for providing both manual and automatic deployment and retraction of said motor driven sunshield installed in an automotive vehicle having a transmission and a windshield, said electrical motor control system further featuring a security mechanism to prevent unauthorized deployment and retraction of said sunshield, said shield assembly, said wheel track assembly, said rack assembly, said drive assembly and said electrical motor control system cooperatively and aggregatively linked, forming said automatically and manually operated motor driven sunshield for covering the interior surface of the windshield of the vehicle, for protecting the vehicle's interior from potentially harmful solar radiation otherwise passing through the windshield.

17. A motor driven sunshield as recited in claim 16, wherein said lengthwise pliant skirt includes an upper slot section skirt, a lower slot section skirt, and a skirt pin section skirt.

18. A motor driven sunshield as recited in claim 17, wherein each said first skirt section guide pin and said second skirt section guide pin have an interior disk flange and an exterior disk flange disposed thereon, each said interior disk flange associated with one of each said wheel tracks and captive within, each said exterior disk flange associated with one of each said wheel tracks and maintained without, said flanges following the contour of each said wheel track for urging lengthwise extension and compression of said dashboard skirt slat and said plurality of each said intermediate slat aggregatively connected thereto.

19. A motor driven sunshield as recited in claim 17, wherein each said first wheel rotates freely about each said associated first wheel tubiform axle and additionally firmly attached thereto, each said first wheel tubiform axle firmly attached and non-rotating within said merlon bores of each associated said slot section first crenelated edge, conversely, freely rotating and slidable in associated said slot section second crenelated edge and associated said skirt slot section crenelated edge, each said second wheel rotates freely about each said associated second wheel tubiform axle and additionally firmly attached thereto, each said second wheel tubiform axle firmly attached and non-rotating within said merlon bores of each associated said pin section first crenelated edge, conversely, freely rotating and slidable in associated said pin section second crenelated edge and associated said skirt pin section crenelated edge, each of said first wheels and second wheels captive within each associated said wheel track for urging lengthwise extension and compression of said plurality of each said intermediate slat aggregatively connected thereto.

\* \* \* \* \*